(12) United States Patent
Collis

(10) Patent No.: US 6,668,891 B2
(45) Date of Patent: Dec. 30, 2003

(54) UNITARY, CIRCUMFERENTIALLY EDGE WOUND FRICTION MATERIAL CLUTCH PLATE, AND METHOD OF MAKING SAME

(75) Inventor: Dean A. Collis, Wheaton, IL (US)

(73) Assignee: BorgWarner Inc., Auburn Hills, MI (US)

( * ) Notice: Subject to any disclaimer, the term of this patent is extended or adjusted under 35 U.S.C. 154(b) by 63 days.

(21) Appl. No.: 09/951,126

(22) Filed: Sep. 12, 2001

(65) Prior Publication Data

US 2003/0047285 A1 Mar. 13, 2003

(51) Int. Cl.[7] ................................................ B32B 31/00
(52) U.S. Cl. ...................... 156/382; 156/499; 156/510; 156/583.1
(58) Field of Search ............................... 156/381, 382, 156/499, 510, 580, 581, 583.1

(56) References Cited

U.S. PATENT DOCUMENTS

| | | |
|---|---|---|
| 3,871,934 A | 3/1975 | Marin |
| 4,002,225 A | 1/1977 | Marin |
| 4,260,047 A | 4/1981 | Nels |
| 4,674,616 A | 6/1987 | Mannino, Jr. |
| 5,094,331 A | 3/1992 | Fujimoto et al. |
| 5,332,075 A * | 7/1994 | Quigley et al. ......... 192/107 R |
| 5,335,765 A | 8/1994 | Takakura et al. |
| 5,460,255 A | 10/1995 | Quigley |
| 5,571,372 A | 11/1996 | Miyaishi et al. |
| 5,615,758 A | 4/1997 | Nels |
| 5,767,022 A * | 6/1998 | Clere et al. .................. 442/101 |
| 5,776,288 A | 7/1998 | Stefanutti et al. |
| 5,897,737 A | 4/1999 | Quigley |
| 5,998,311 A | 12/1999 | Nels |
| 6,019,205 A | 2/2000 | Willwerth et al. |

\* cited by examiner

Primary Examiner—James Sells
(74) Attorney, Agent, or Firm—Emch, Schaffer, Schaub & Porcello Co., L.P.A.

(57) ABSTRACT

A friction material has a plurality of connected sections defined by a plurality of notches therebetween. Each notch has an apex which compensates for tear and compression of the friction material when the friction material is circumferentially placed on a flat surface of an annular core plate. In certain embodiments, a multiple linked loading device places the notched friction material adjacent a core plate to form a clutch plate.

23 Claims, 26 Drawing Sheets

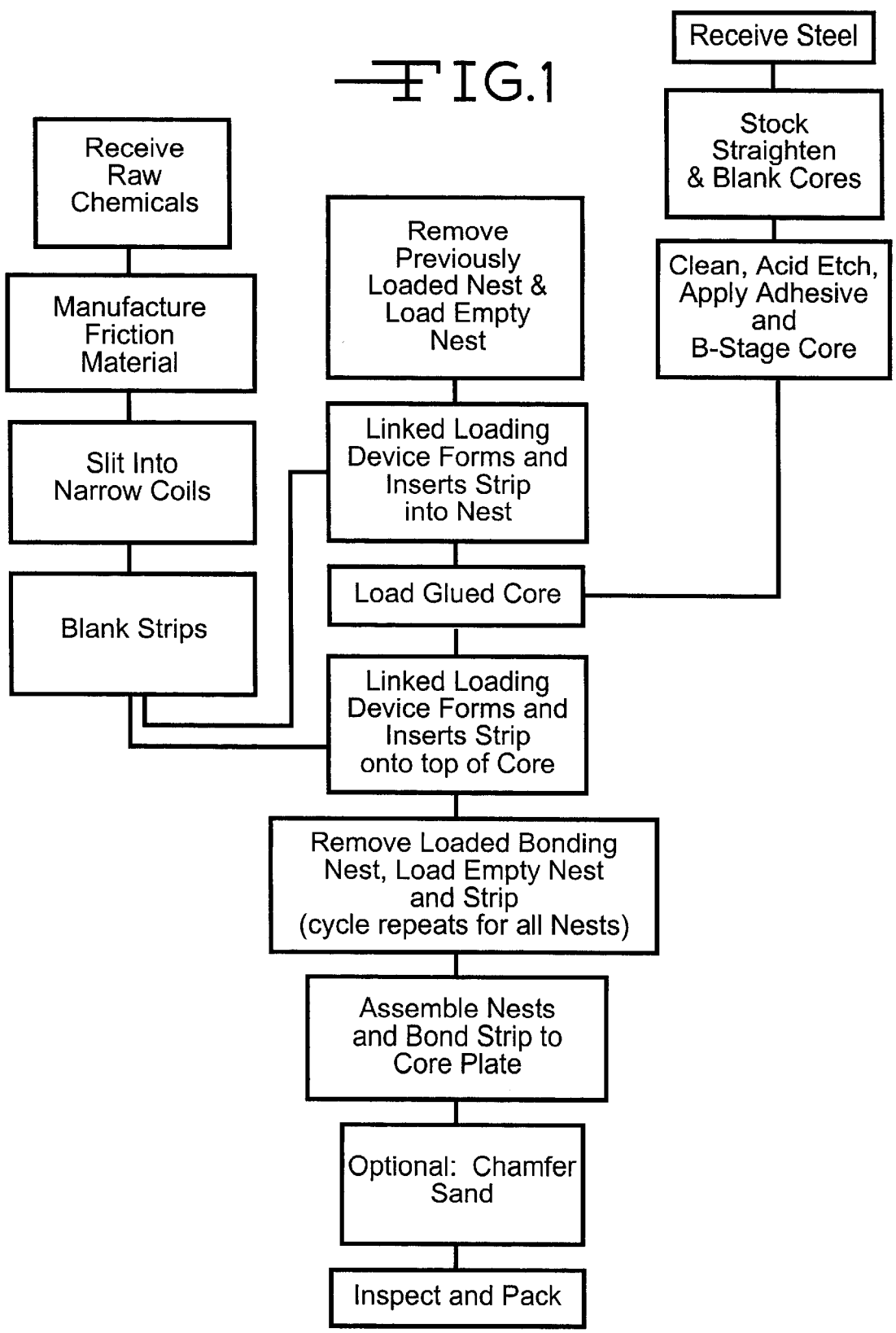

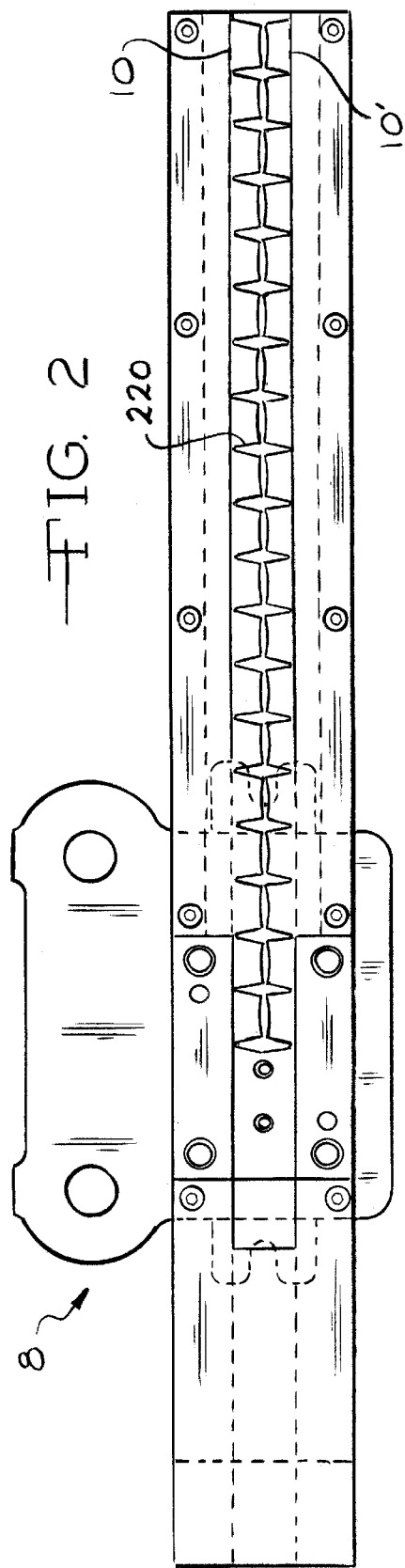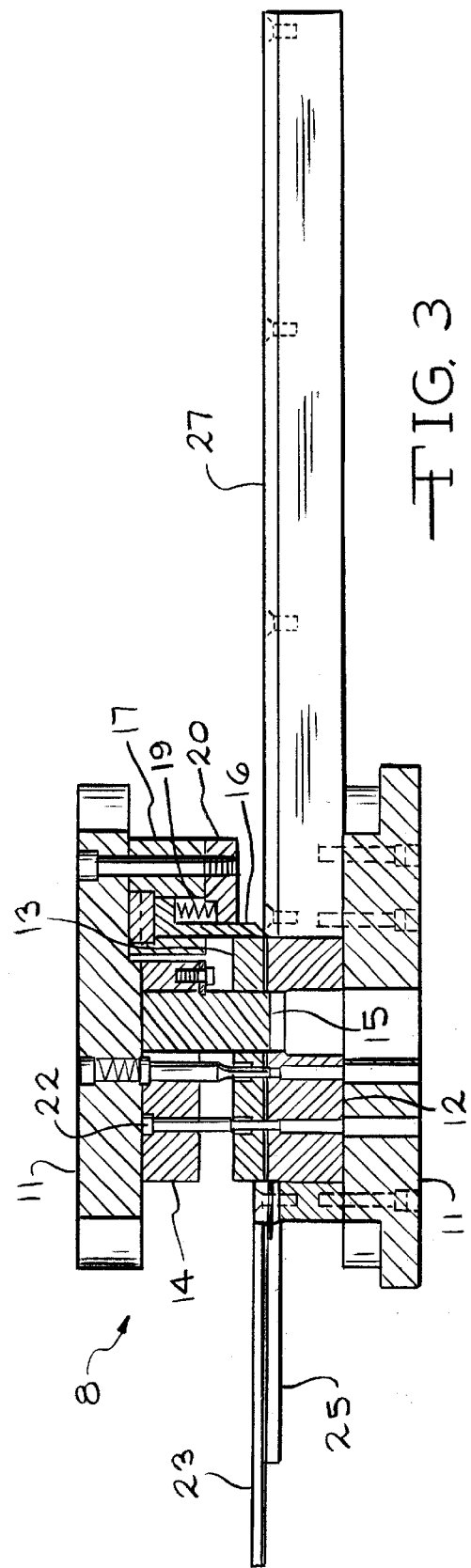

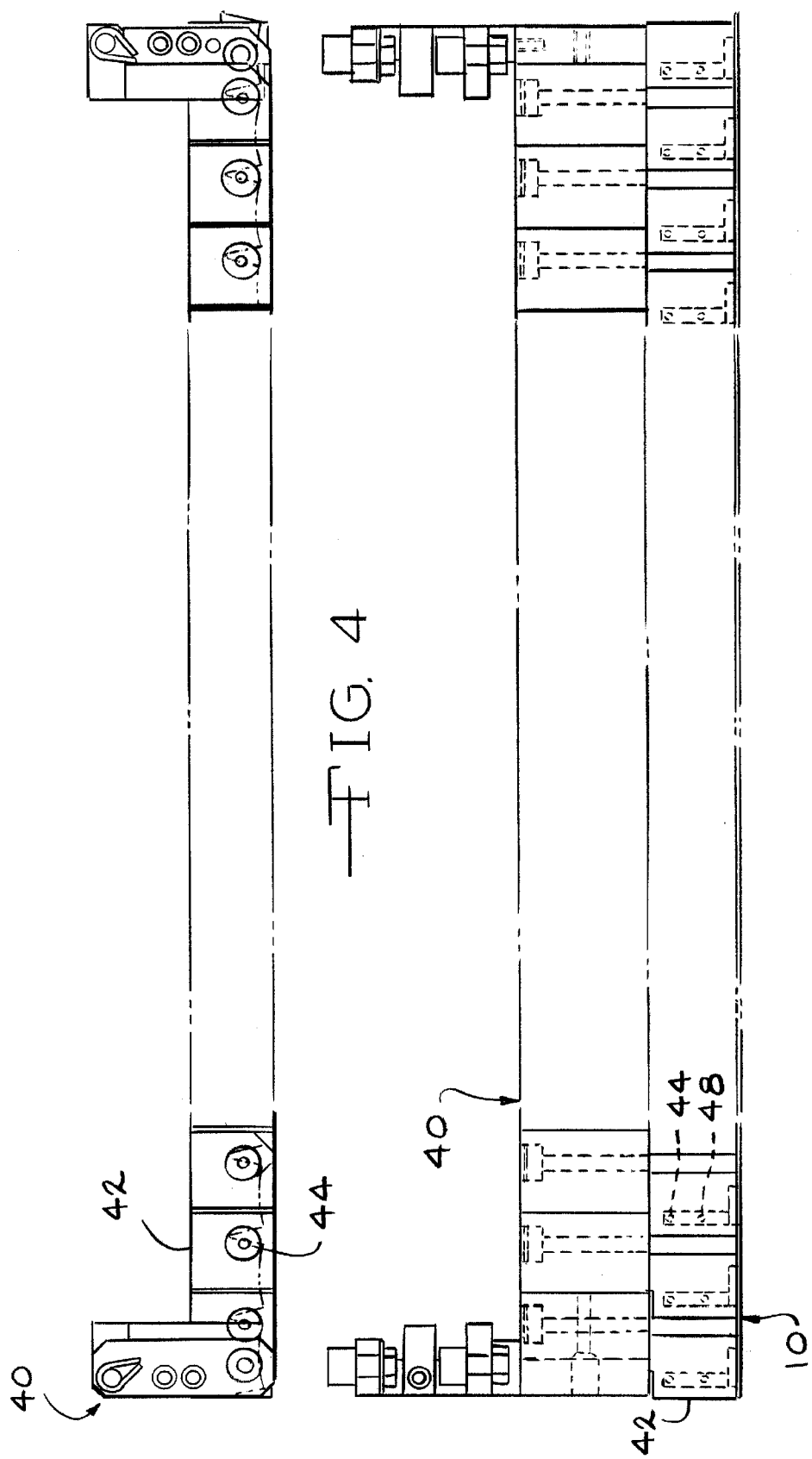

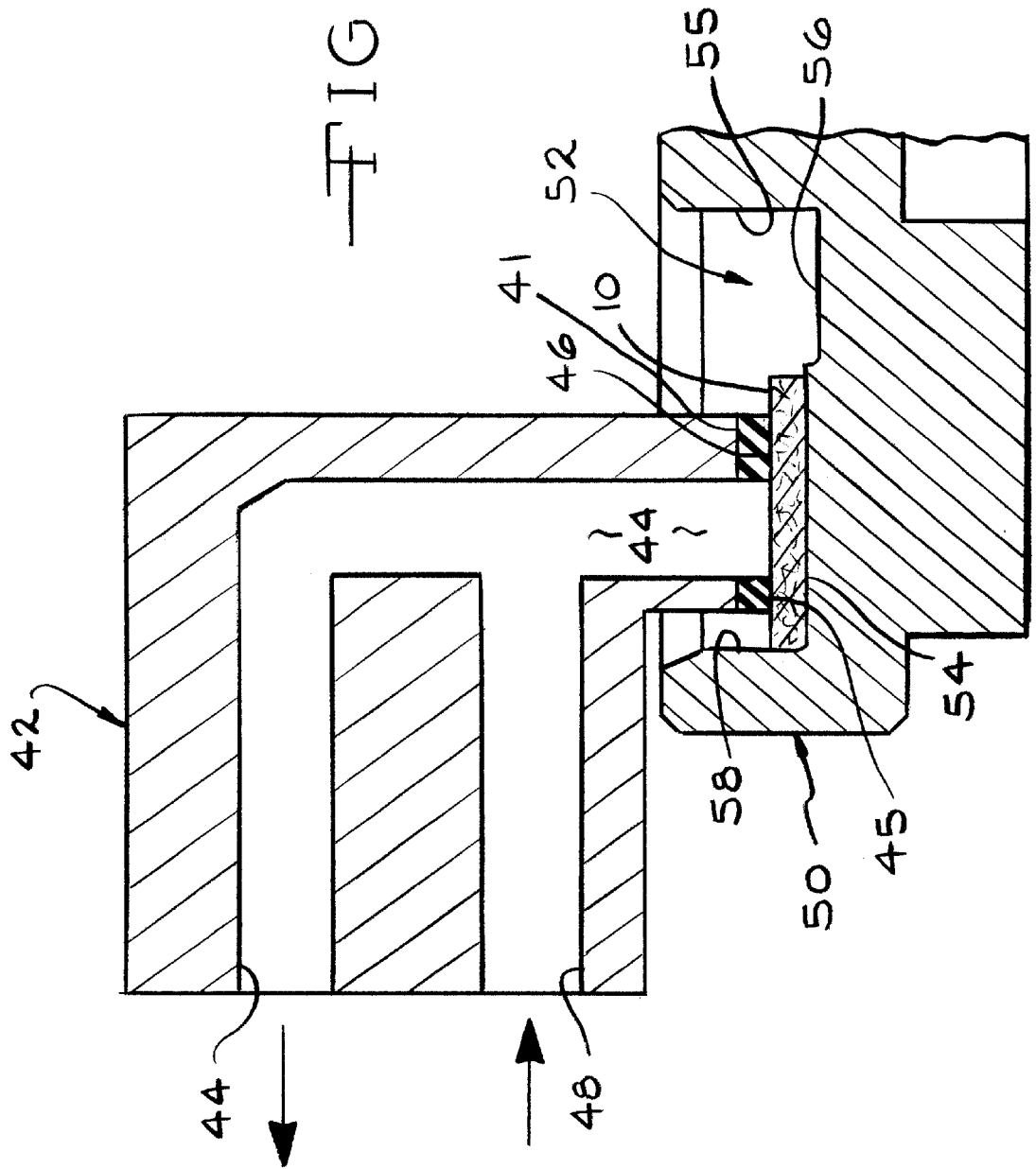

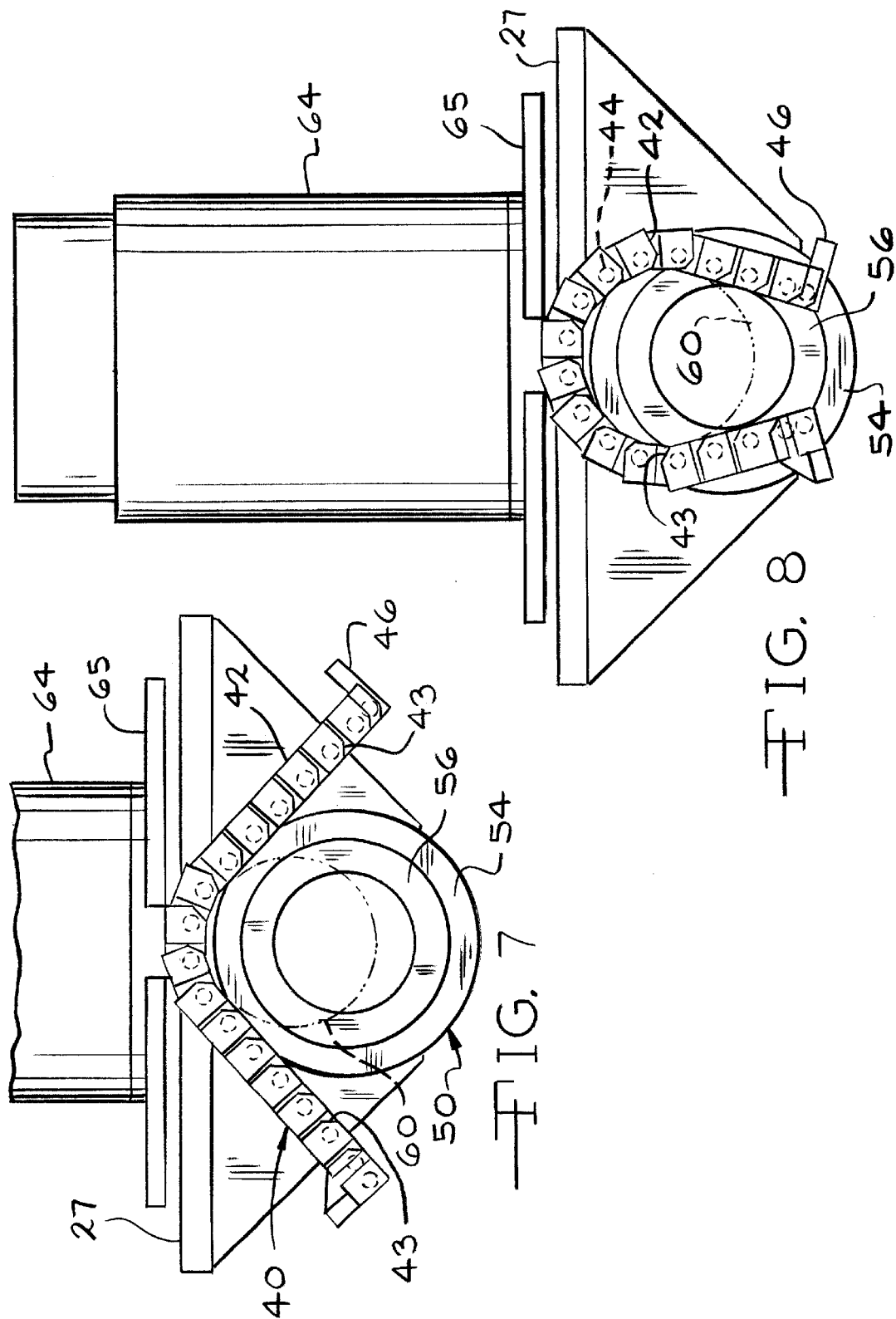

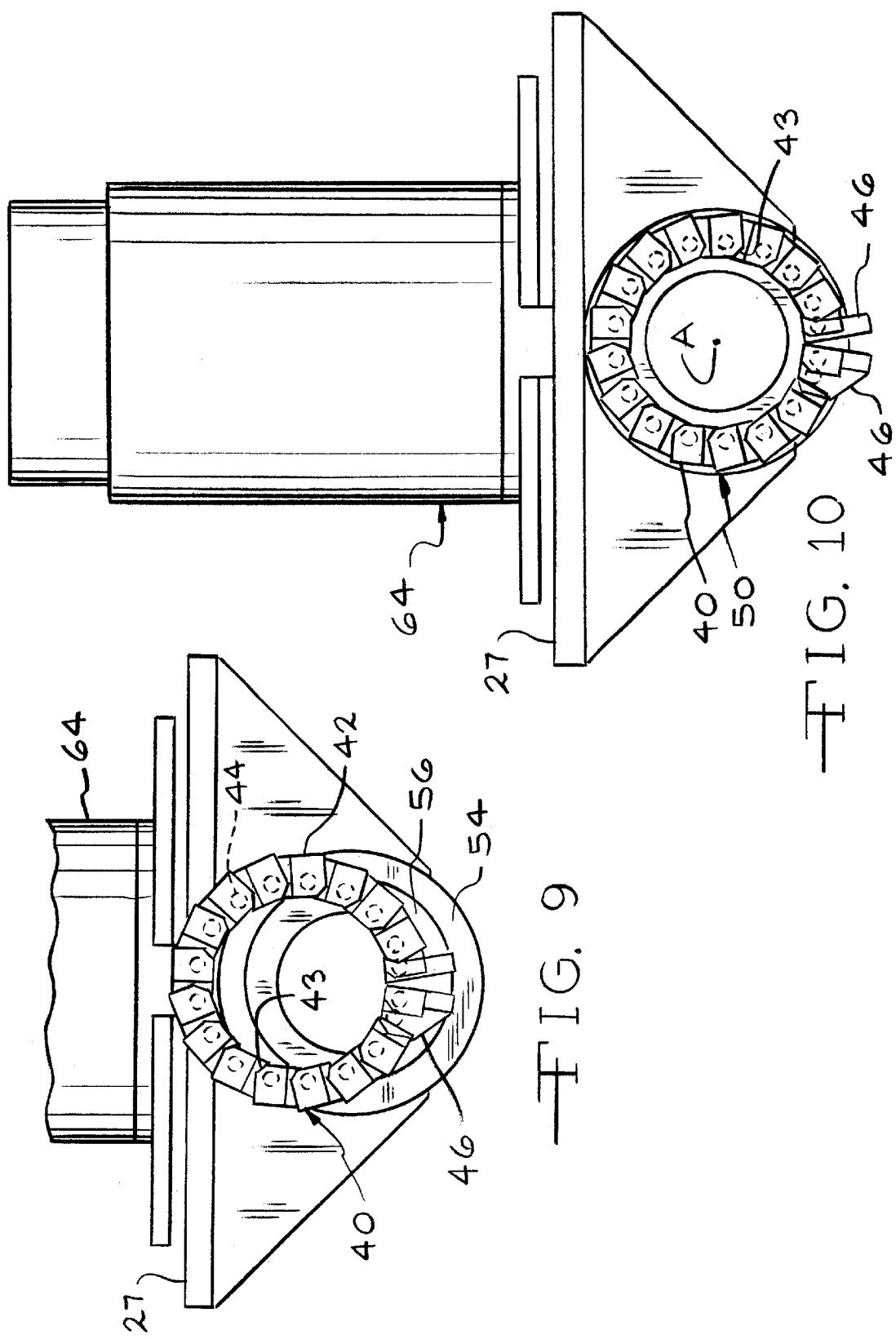

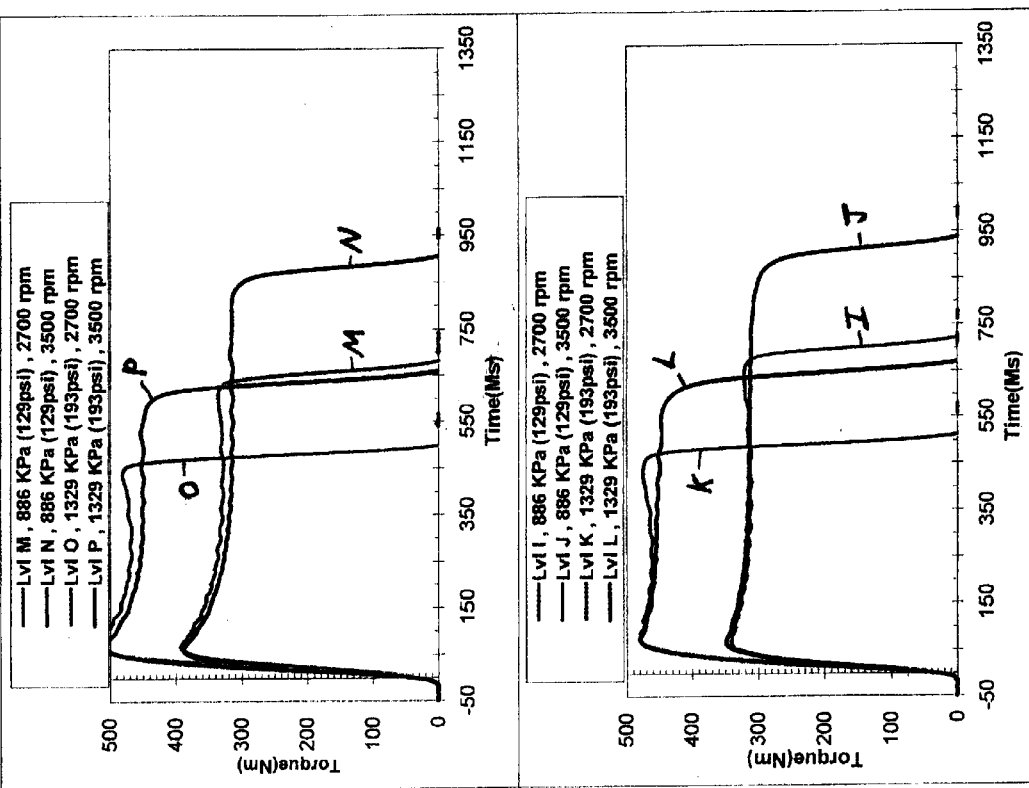
Fig. 31 B
Fig. 31 D
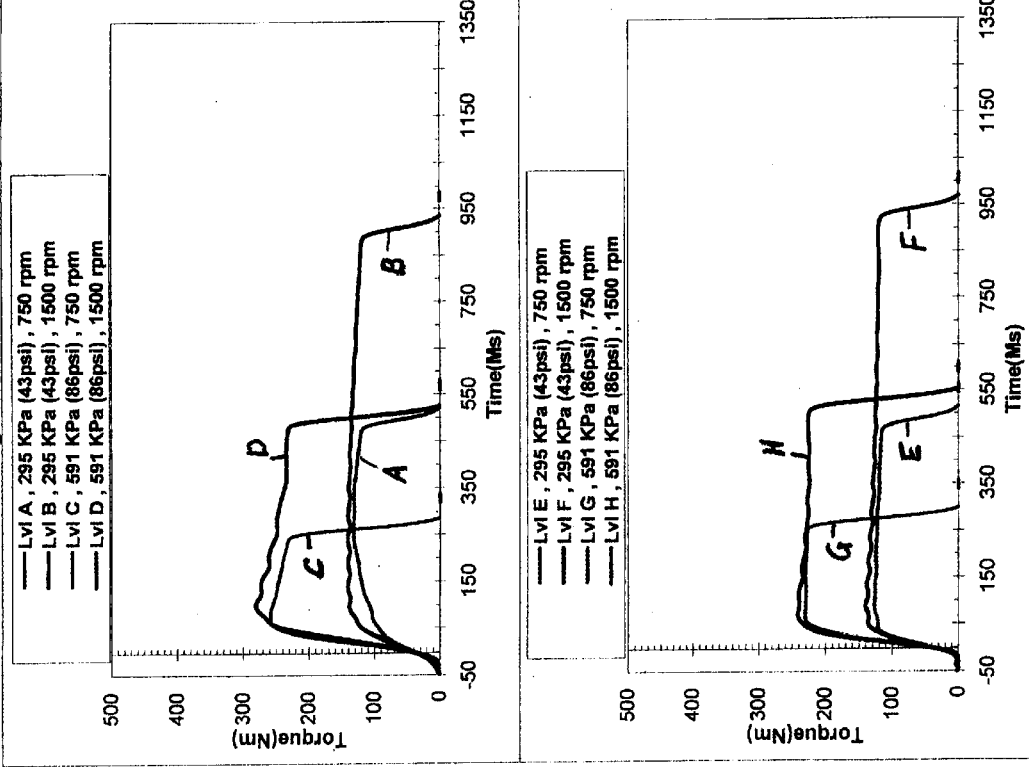
Fig. 31 A
Fig. 31 C

UNITARY, CIRCUMFERENTIALLY EDGE WOUND FRICTION MATERIAL CLUTCH PLATE, AND METHOD OF MAKING SAME

TECHNICAL FIELD

The present invention relates generally to a method and apparatus for making a friction plate having a friction material facing and to the friction material itself. More specifically, the invention is directed to a method and apparatus for making a friction plate having a unitary, or single, circumferentially edge wound friction material on one or both sides of a core plate.

The present invention also relates generally to automatic transmission clutch plates, and more particularly, to a clutch plate having a friction material bonded thereto where the friction material is blanked as a straight notched strip of friction material. The friction material is formed into a circular shape and is bonded to the core plate.

BACKGROUND OF THE PRESENT INVENTION

The present invention relates to a method and apparatus for making friction materials for use with a wet-type multi-plate clutch and further relates to the friction material itself. The prior art multi-plate clutches generally comprise a plurality of interleaved clutch discs and reaction plates which engage to provide the transmission of energy from a drive engine to a drive wheel. Wet-type clutches also utilize a lubricant such as oil to reduce clutch wear, cool the friction facings of the clutch discs and provide desired hydrostatic forces between the clutch plates and clutch discs.

The friction material is usually composed of fibrous paper which normally is impregnated with a phenolic resin. The friction material is commonly cut from a continuous strip of rectangular sheeting composed of the friction material which is fed through the die or cutting apparatus. The friction material is relatively expensive and, therefore, it is desirable to optimize the elimination of waste from the manufacturing process.

Once the friction material is impregnated with the phenolic thermoset resin, it cannot be economically recycled. Further, elimination of waste product from the manufacture process assists in meeting compliance standards. The proper disposal of any scrap is the focus of increasing regulation by current environmental regulators. Any scrap resulting from the cutting process must be disposed of in an appropriate manner and, because of the materials from which the friction facing is manufactured, this disposal is becoming increasingly costly.

Further, in the interest of optimizing clutch life, operational smoothness, and cooling efficiency for the friction facings, the literature and art relating to wet-type clutches provides numerous clutch designs producing a large variety of friction facing materials and designs of friction facing materials. A common friction facing, currently available is shown by the disclosure of U.S. Pat. Nos. 4,260,047 and 4,674,616 which disclose friction discs, for use with clutches, which are formed from friction material and produced from the joining of a plurality of separate arcuate segments. The arcuate segments are pre-grooved to allow cooling oil to flow over the friction facing during clutch operation.

The U.S. Pat. Nos. 5,094,331, 5,460,255, 5,571,372, 5,776,288, 5,897,737 and 6,019,205 disclose clutch friction plates having a large number of individually placed friction material segments on the plate. The segments are in a spaced apart relationship such that an oil groove is provided between every adjacent segment.

The U.S. Pat. Nos. 3,871,934 and 4,002,225 show a friction material wound around the outer periphery disc, such that it overlaps the disc on both sides. The overlap is then cut at intervals around the periphery and folded onto the surface of the disc.

The U.S. Pat. No. 5,335,765, discloses a friction member having sets of first grooves and second grooves disposed in a radial plane and inclined obliquely backwardly in relation to the direction of rotation.

The U.S. Pat. Nos. 5,615,758 and 5,998,311 show friction yarn facing materials with no grooves, but rather, the warp and fill yarns form channels to allow for the flow of fluid therethrough.

The manufacturing of many of these friction materials produce a large amount of unused or scrap material. It is, therefore, a primary object of the invention to effectively reduce the amount of scrap remaining after cutting of the friction material.

It is also desired that the sufficient cooling and lubrication of the friction material and clutch plates occurs such that smooth engagement and disengagement of the clutch is maintained without creating excessive wear on the members of the clutch and friction facing material. Many prior art friction material designs incorporate the use of grooves or slot patterns within the facing material to achieve the desired cooling and lubrication by allowing the passage of a fluid such as oil through the friction facings. Such cooling grooves are generally produced from one of three labor intensive methods. One method provides that the friction material is pre-grooved prior to being cut and applied to the clutch plate in a manner such as that taught by U.S. Pat. No. 4,260,047. Another method of producing grooves utilizes configured tooling to compress portions of the friction material during the hot pressure bonding process. The third method involves producing cut grooves in a finished friction plate by mounting the plate onto a fixture and passing multiple milling and grinding wheels through the friction material to cut distinct grooves of desired depth and definition.

The common failing of the previous designs of friction materials lies in the formation of intricate shapes and designs which consequently leads to manufacturing complexities, increased tooling costs, increased scrap production and the resultant concerns regarding proper disposal of the scrap. Further, the previous friction materials are all individually manufactured to specific types of friction clutches and, generally speaking, cannot be used in a wide variety of applications.

It is an object of the present invention to manufacture a friction clutch plate having distinct cooling groove patterns of desired depth and definition without the need for secondary operations and attendant machinery.

It is another object of the invention to provide an apparatus for making a continuous friction material which nearly scrapless in its manufacture.

It is yet another object of the present invention to provide a method and apparatus for making a friction material having a plurality of desired grooves therein.

Yet another object of the invention is to provide a method and apparatus for making a friction material having design advantages designated to produce enhanced product performance, and specifically reduced drag and improved shift feel (i.e., the ratio of end point coefficient of friction/midpoint coefficient of friction).

Yet a further object of the invention is to produce a method and apparatus for making a friction material having the capability of maintaining static pressure and holding dynamic fluid flow within the grooves of the friction material during operation of the engaged clutch disc and clutch plate.

It is another object of the invention to provide a friction material which is universally applicable to differing types of clutch usage.

Yet another object of the invention is to provide a method for bonding the friction material to a core plate by induction bonding, or other suitable methods, of the friction material to the core plate.

Disclosure of the Present Invention

A unitary, circumferentially edge wound friction material and a method and apparatus for making a wet-type friction clutch plate are disclosed. The friction material has a plurality of Λ-notches and is a unitary, or continuous strip of material. The friction material is oriented on the clutch plate so as to create desired lubrication and cooling pumping functions through full depth oil channels created in the friction material. The orientation of the notches in the friction material achieves a desired direction of oil flow radially into or out of the clutch plate and also creates a desired amount of hydrostatic pressure. The size of the friction material and the shape, spacing and orientation of the notches all operate to control the degree of fluid pumping, the hydrostatic pressure, and the amount of cooling of the friction clutch plate.

In particular, the present invention describes a method and apparatus for making a clutch plate with an unitary, circumferentially edge wound friction material. The friction material is blanked with a desired number of notches as a straight strip of material and then is wound circumferentially to cover a face of the core plate. The notches allow the strip to be edge wound around an outer circumference of the core plate and also to produce desired grooves in the completed clutch plate.

In a preferred aspect, the notches have a generally Λ-shape where each notch has an apex which compensates for tear and compression of the friction material when the friction material is circumferentially placed on the core plate. In a preferred aspect, the apex has a generally circular shape which prevents the friction material from fracturing or separating. The unique geometry of the Λ-notch and its apex promotes both desirable tension and desirable compression in the friction material.

The notched friction material provides a significant improvement (greater than 50%) (i.e., from 18–32% with full ring to 80–90% with notch friction material depending on geometry) in friction material utilization over conventional full ring blanked friction facings. In certain embodiments, the notches are "dead end" such that there is no groove exit at the outside diameter of the friction plate. These "dead end" grooves retain the fluid at the friction interface. This is especially desirable in low fluid flow application, (where it is difficult to obtain high fluid flow).

In another embodiment, the a portion of the apex of the notches is removed, preferably by being sanded, or chamfered, such that there is restricted fluid flow from one end of the groove to the other end of the groove. These restricted flow groove exits provide a reduction in parasitic drag when the clutch is not applied.

One criterion in determining the shape, spacing and orientation of the notches in the friction material of this invention is the ratio of the circumference (360°) to the desired number of grooves in the length of friction material to be placed on the core plate. That is, 360°÷number of grooves=angle of each Λ-notch.

As the performance requirements for automobiles become more stringent, the clutches must be able to provide high torque at high RPMs thereby operating efficiently at high temperatures. This performance requirement therefore demands more expensive, higher performance materials for use as the friction material. Thus, as the material costs increase, the present invention provides for an efficient method to produce a friction plate which minimizes the friction surface area while simultaneously striving to maintain cooling and lubrication requirements. The Λ-notched friction material is responsive to the greater heat generation and the heat dissipation within the clutch which are necessary to meet the performance standards for the higher RPM/smaller engines common to today's automobile.

Another important performance requirement of today's automotive clutches is to produce minimal drag when the clutch is not applied, e.g. an open reverse clutch that is rotating but not applied when cruising at highway speed. Lower open clutch pack drag translates into higher fuel efficiency of the vehicle. The present invention produces lower open pack (parasitic) drag than other conventional designs (non-groove, cut grooved, molded groove).

In the method of making the clutch plate of the present invention, a strip of friction material is blanked out, or notched, with the desired Λ-notch geometry defining each notch. The blanked out strip of friction material is cut to a desired length. The length of Λ-notched friction material is picked up by a loading device, and is circumferentially placed adjacent a bonding nest. The bonding nest is used to help assemble the components of the clutch plate: the Λ-notched friction material and a core plate. The loading device comprises a plurality of connected links where each link has at least one vacuum port. The linked loading device is moved adjacent the cut strip of friction material. The vacuum is engaged which allows the loading device to pick up the cut strip of friction material. The links of the linked loading device are moved, or laterally rotated, to form a closed circle. The linked loading device is positioned in coaxially alignment with the nest. The vacuum is released and the friction material is placed in the nest.

A core plate is placed in the nest and the above described process is repeated to place a second strip of friction material on top of the core plate.

Thereafter, the friction material is adhered to the core plate in a desired manner. The method for adhering the core plate involves using a thermosetting adhesive coating on the core plate. Thereafter, the friction material and core plate are compressed and heated in a suitable manner. The core plates can be stacked into a multiple nesting arrangement and heated in an oven. In another method, the assembled core plate with the friction materials adjacent thereto can be heated by conduction. Yet another method involves heating the core plate and friction materials adjacent thereto for with an induction coil.

The various embodiments of the present invention will be more readily understood, in their application to the objectives of this invention by reference to the accompanying drawings and the following description of the preferred embodiments of the invention.

BRIEF DESCRIPTION OF THE DRAWINGS

FIG. 1 is a schematic flow diagram showing an assembly process for making a clutch plate with a unitary, circumferentially edge wound friction material.

FIG. 2 is a schematic top plan view of a stamping die for producing a Λ-notched friction material strip.

FIG. 3 is a schematic side elevational view of the stamping die of FIG. 2.

FIG. 4 is a plan view of a multiple link loading device, partially in phantom.

FIG. 5 is a schematic side elevational view, partially in phantom, of the multiple link loading device shown in FIG. 4.

FIG. 6 is a schematic side elevational, cross-sectional view of a portion of a link in the linked loading device.

FIG. 7 is a schematic plan view of a step in forming a unitary strip of friction material.

FIG. 8 is similar to FIG. 7 and shows another step in forming a unitary strip of Λ-notched friction material.

FIG. 9 is similar to FIG. 7 and shows another step in loading a unitary strip of friction material.

FIG. 10 is similar to FIG. 7 and shows another step in loading a unitary strip of friction material.

FIGS. 31A–D are graphs showing the SAE MuPVT test (981D) for a Λ-notched friction material with chamfer sanded edges.

DETAILED DESCRIPTION OF PREFERRED EMBODIMENTS

Figure 11:
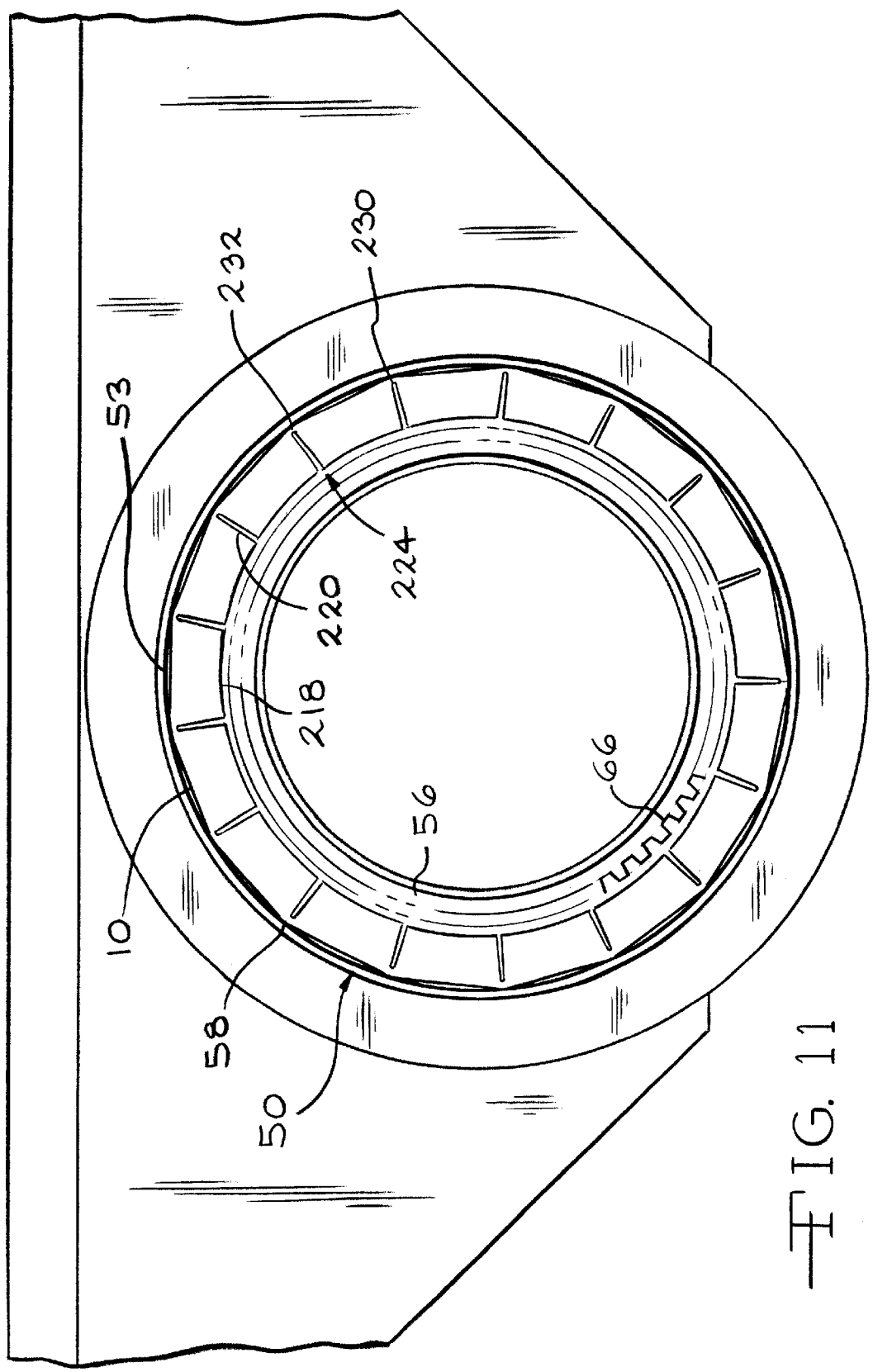
FIG. 11 is a schematic plan view showing a strip of friction material placed adjacent a core plate, in the bonding nest.

FIG. 1 shows a flow diagram for producing a clutch plate with a unitary, circumferentially edge wound friction material. Referring first to the right hand side of the figure, the steel is received, straightened, and blanked as a core. The core is then cleaned, acid-etched and the adhesive is applied; in various embodiments, when the adhesive is a thermosetting adhesive, a B stage thermosetting process is used to "preset" the adhesive material. Referring now to the left hand side of the figure, the raw materials are received and the friction material is manufactured. The friction material is slit into narrow coils having a desired width. The material is blanked and Λ-notches are cut into the friction material using the apparatus of the present invention. The center of the flow diagram shows the process during a continuous operation where a loaded bonding nest is removed and a new empty nest loaded into the machine. A linked loading device forms and inserts a first strip of the notched friction material into the bonding nest. A glued core plate is loaded into the bonding nest and a second strip of the notched friction material is placed on top of the glued core. The loaded bonding nest is removed and the cycle is repeated for a desired number of times. Thereafter, all nests are assembled, clamped, and heated to bond the friction material to the core.

In certain embodiments, a portion of the friction material adjacent the edges of each clutch plate with the unitary edge wound friction material on opposing sides thereof is removed, for example, by being chamfer sanded. The chamfer sanding of the edges provides the desired clutch plate with restricted, or partially opened, grooves. Finally, the clutch plates are inspected and packed for delivery.

Referring to FIG. 2, a stamping die 8 for simultaneously producing two strips of friction material 10 and 10' is shown. It is to be understood that, while not shown, the die 8 can be configured so that only one strip of friction material 10 is cut. The stamping die 8 generally includes a die set 11 operatively connected to a die block 12. A stripper 13 is positioned in a spaced apart relationship to the die block 12. A punch holder 14 is positioned adjacent an upper portion of the die set 11. A notching punch 15 is operatively connected to the die set 11. A cut off or sliding parting punch 16 is positioned downstream of the punch 15 to provide a cut off of predetermined lengths of the friction material.

The cut off punch 16 is operatively mounted to a cut off block 17 which is retracted by a spring 19 held in place by a spring block 20. A perforated punch 22 is operatively positioned within the punch holder 14.

The stamping die 8 further includes a stock guide 23 operatively positioned on a stock support 25. The friction material 10 is guided along on the stock guide 23 as it enters the stamping die 8. The friction material 10 is supported on a strip support plate 27 after being punched and cut.

As will be explained in detail below, the punch 15 provides a desired number of unique Λ-notches 220 in the friction material 10. The cut off or parting punch 16 is activated after any number of desired strokes of the notching punch 15 to cut the strip of friction material off to a desired length.

The unique Λ-notched geometry determines the resulting oil groove width and how well the strip of friction material conforms to a bonding nest, as will be described in detail below. The pitch, or number, of Λ-notches in a strip of material also has an influence on how well the formed friction material conforms to the bonding nest as will also be described in detail below. In certain preferred embodiments, the manufacturing process is most efficient when the strip of friction material contains from about 12 to about 40 and preferably about 16 to about 25 Λ-notches in a desired length of friction material.

The blanked out strip of friction material 10 then moved to an assembly location. It is to be understood that the present invention contemplates automatically moving the length of friction material 10 from the strip support plate 27 to a point adjacent a multiple linked loading device 40, as shown in FIGS. 4–11.

FIG. 4 generally shows a multiple link loading device 40 having a plurality of links 42. It is to be understood that the number of links in the device 40 is preferably the same as the number of notched sections of the strip of friction material 10. Each link 42 has at least one vacuum port 44, as can be seen in FIGS. 5 and 6. The linked loading device 40 is moved adjacent and into contact with a length of notched friction material 10, as shown in FIG. 5.

FIG. 5 generally shows a schematic illustration of the linked loading device 40 in a pick up or straight position and firmly holding the length of notched friction material.

FIG. 6 generally shows a schematic enlarged view of a link 42 and the first opening or port 44. In operation, a vacuum is created such that each section of the Λ-notched friction material 10 adheres to a bottom surface 46 of the link 42. An elastomer material 41, such as a rubber or urethane material is operatively attached, such as being glued, to an end 45 of each link 42, adjacent the first opening or port 44, for improved vacuum sealing to the Λ-notched friction material 10. The link 42 preferably further contains a second port 48 for reversing the vacuum and providing a positive force of pressure in order to deposit the friction material 10 in a bonding nest 50, as can be seen in FIG. 6. The link loading device 40 holds the length of notched friction material 10 firmly adjacent the bottom surface 46 of each link 42 during the forming operation.

Figure 12:
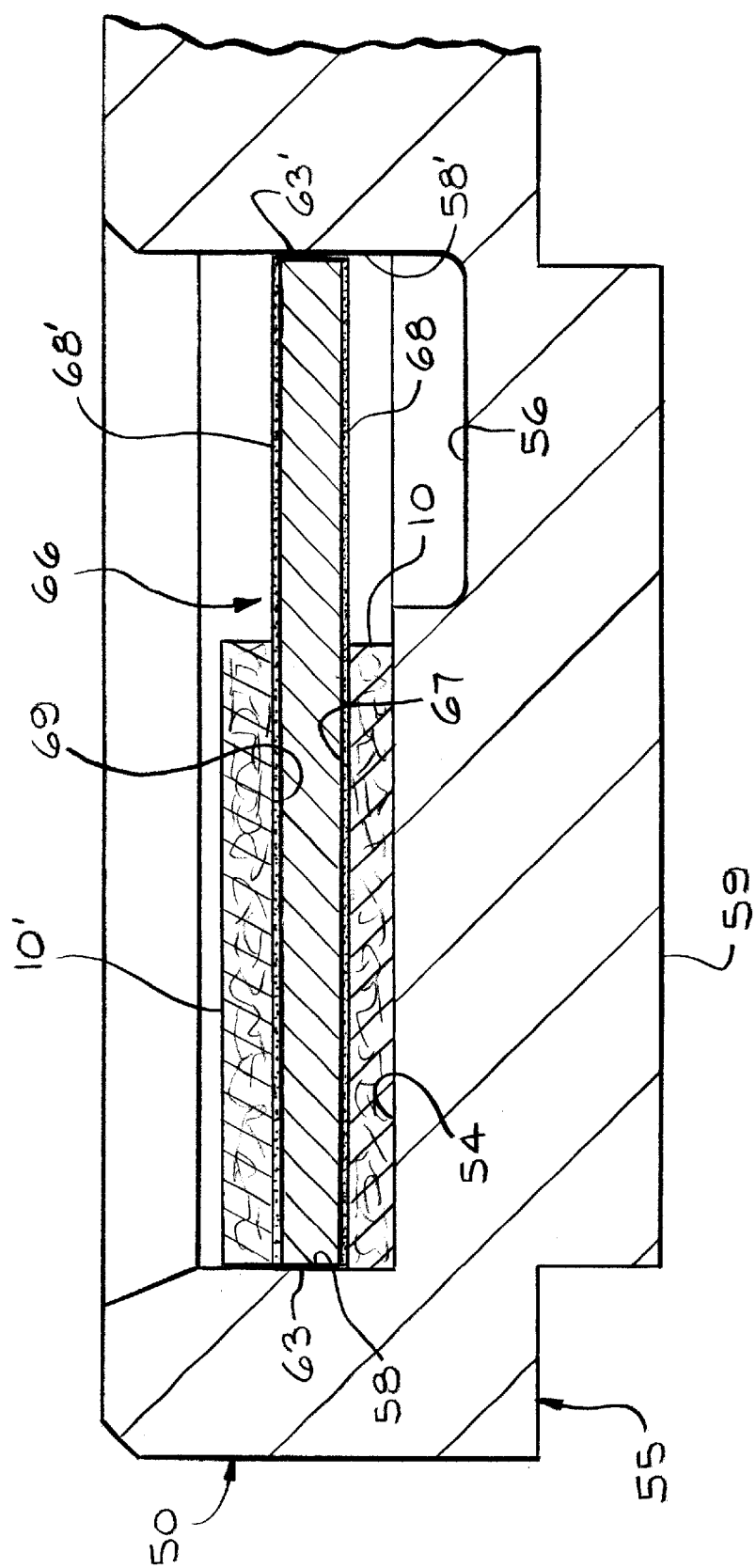
FIG. 12 is a schematic, cross-sectional, side elevational view of opposing strips of friction material adjacent an adhesive-coated core plate in an assembly/bonding nest.

The bonding nest 50, as shown in FIGS. 6 and 12, defines a circumferentially extending annular recess 52 having a first circumferentially extending planar surface 54 for receiving the friction material 10. The surface 54 can generally extend toward a first interior wall 55 in a planar direction or, alternatively, can have a recessed portion 56 adjacent the inner wall 55. The bonding nest 50 further defines an interior wall 58. When the friction material 10 is placed in the bonding nest 50, portions of the friction material 10 that are adjacent the Λ-notches contact the wall 58. Due to the geometry of the Λ-notches in the friction material 10, the friction material 10 has a spring-like action and is forced against the wall 58 of the bonding nest 50. A detailed discussion of the Λ-notches in the friction material is provided below.

Referring now to FIGS. 7–11, the operation of the multiple links loading device 40 is schematically shown. The linking device 40 retrieves a length of friction material 10 from the support plate 27 or other suitable position. It is to be understood that the support plate 27 shown in FIGS. 7–11 can be the extension of the support plate 27 shown in FIG. 3. Alternatively, it is to be understood that the die stamp 8 and multiple link loading device 40 can be separate operations. In either event, a similar type of support plate can be used to hold or support the length of notched friction material 10.

The links 42 of the multiple link loading device 40 are interconnected such that each link 42 moves to a desired position with respect to the adjacent links. Each link 42 has a desired shape or configuration such that the plurality of links 42 can be pivoted into a desired position. As seen in FIGS. 7–10, each link 42 has an angled face 43 that allows the links 43 to be formed into a circular shape. The multiple link loading device 40 includes an apparatus 46 operatively connected to the links 42 for moving or encircling the links 42 into the circular shape. The multiple link loading device 40 further includes an arbor 60 around which the links 42 are formed into the circular shape.

In operation, the encircling apparatus 46 causes the multiple link loading device 40 to be wrapped around the arbor 60, generally shown in phantom in FIGS. 7–10. Each link 42 has the desired configuration such that the links 42 can be wrapped around the arbor 60 as shown in FIGS. 8 and 9 to form a circular shape. Once the circular shape of the multiple link loading device 40 is completed, as shown in FIG. 9, the arbor 60 is moved in a radial direction such that the multiple link loading device 40 is coaxially positioned around an axis A extending through the bonding nest 50 and the multiple link loading device 40.

It is to be understood that the arbor 60 is operatively connected to a suitable first translation device 64. The first translation device 64 is operatively connected to the encircling apparatus 46 and the multiple link loading device 40. The first translation device 64 provides radial movement of the arbor 60 and the multiple link loading device 40 into the coaxial alignment with the bonding nest 50. A second translation device 65 is also operatively connected to the encircling apparatus 46 and the multiple link loading device 40. The second translation device 65 provides axial movement of the arbor 60 and the multiple link loading device 40 into position adjacent the bonding nest 50. The second translation device 65 lowers the multiple link loading device 40 with the circumferentially wound friction, into the bonding nest 50.

Referring now to FIG. 6 and then FIG. 11, the multiple link loading device 40 provides a reversal of the vacuum being applied to the friction material 10 through the port 44 by applying a reverse or positive pressure air through the port 48. The positive pressure air forces the friction material 10 onto the surface 54 of the bonding nest 50. Due to the Λ-notching of the friction material 10, the friction material 10 circumferentially rests adjacent the edge or wall 58 of the bonding nest 50.

FIG. 12 shows the greatly enlarged schematic cross-sectional view of the bonding nest 50 having a core plate 66 with adjacent friction materials 10 and 10'. In certain embodiments, an outer edge 63 of the core plate 66 is adjacent the wall 58 with dead end groove version. While not shown in FIG. 12, it should be understood that there is a space for friction material overhand on the open (restricted) exit embodiments. An inner edge 63' of the core plate 66 is adjacent the interior wall 58'. The core plate 66 generally has layers of suitable adhesive material 68 and 68' on a first surface or face 67 and a second surface 69, respectively. The suitable layer of adhesive material 68 is adhered and dried to the surfaces 67 and 69 of the core plate 66 earlier in the manufacturing process, as was described above with reference to FIG. 1. FIG. 12 shows an opposing length of notched friction material 10' which is also positioned by a multiple linked loading device 40 onto the second surface 69 of the core plate 66. The bonding nest 50, as generally shown in FIG. 12, holds the friction materials 10 and 10' and the core plate 66 during a bonding process of the friction materials 10 and 10' to the core plate 66 to form a friction clutch plate.

Figures 13, 14:
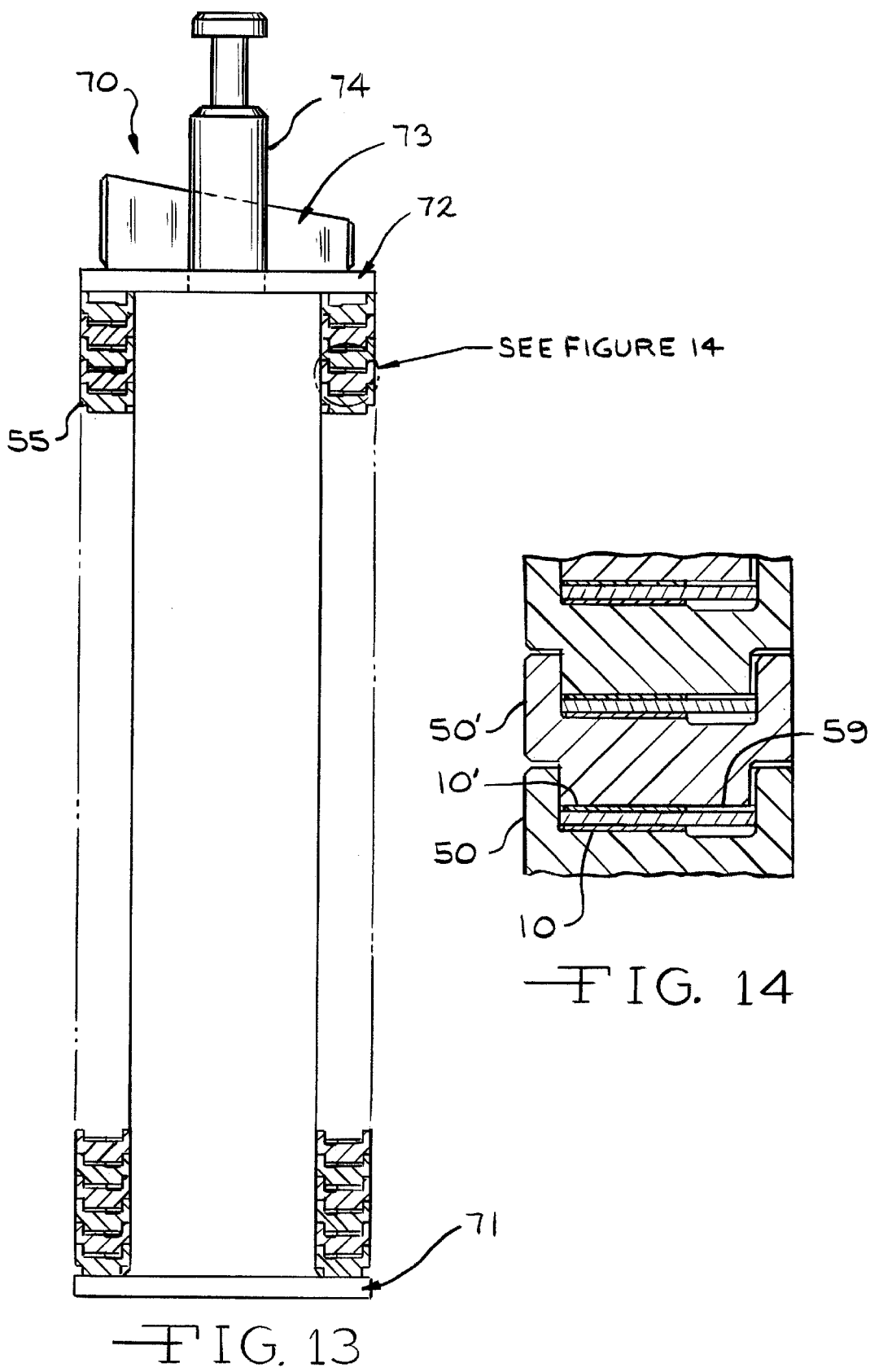
FIG. 13 is a schematic side elevational view, partially in cross section and partially in phantom, showing a plurality of assembly/bonding nests clamped together for placement in a heating oven.
FIG. 14 is an enlarged view of the area shown in FIG. 13.

FIGS. 13 and 14 show a schematic illustration of one bonding process where a plurality of bonding nests 50 are stacked together and positioned in a clamping assembly 70 for heating in an oven (not shown). As seen in FIGS. 12–14, the bonding nest 50 can have a notched lower edge 55 which allows each adjacent bonding nest 50 to be stacked in a secure manner. The multiple nests 50 are stacked one on top each other for efficient production. As seen in FIG. 14, a bottom surface 59 of one bonding nest 50' is positioned on a friction material in an adjacent bonding nest 50. Bonding pressure is maintained on each assembly of nest 50, core plate 66 and friction materials 10 and 10' by applying a force and clamping the stack of multiple nests 50 with a post 74 having opposing end plates 71 and 72, and a wedge 73.

Figure 15:
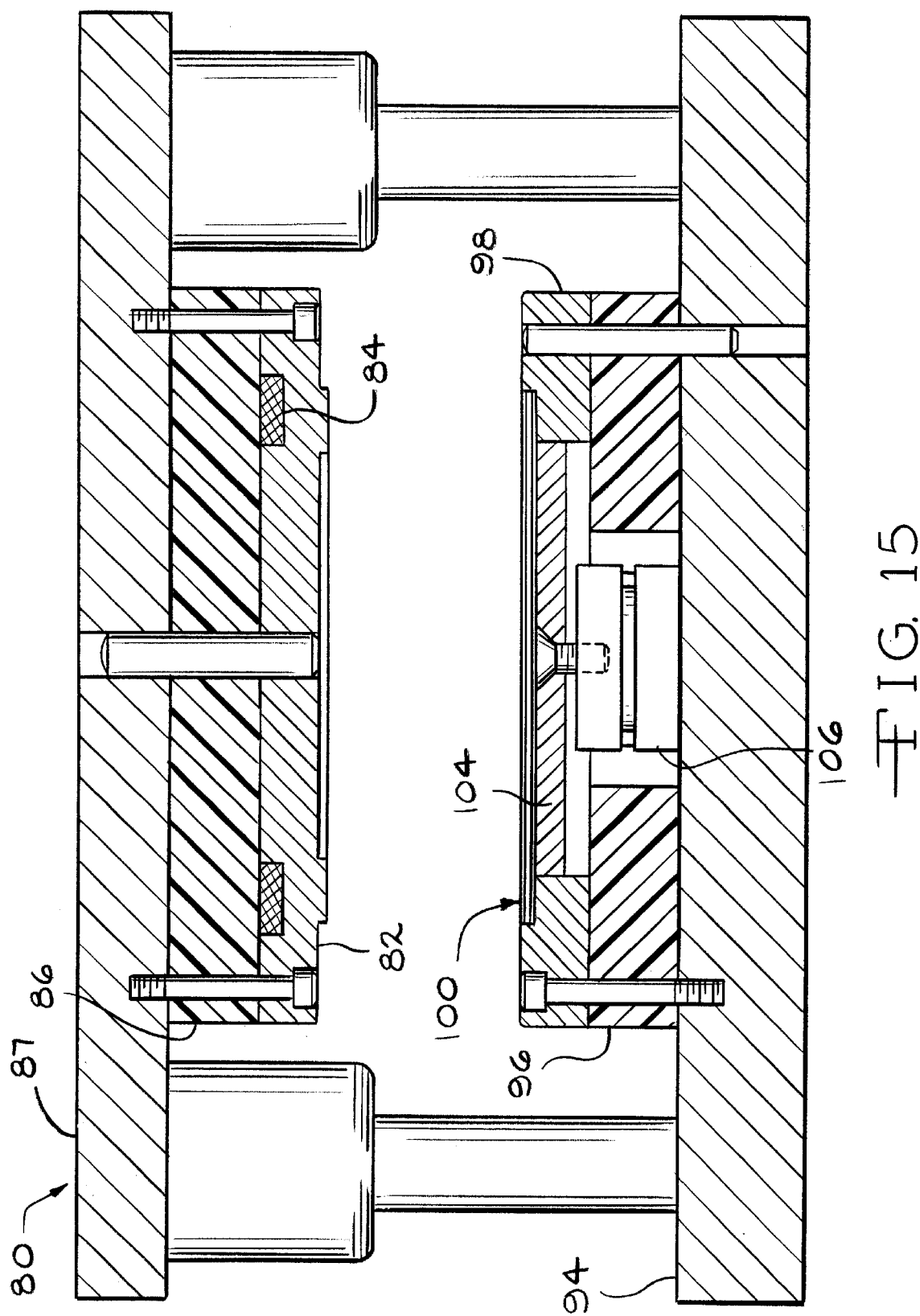
FIG. 15 is a schematic side elevational view, partially in cross section and partially in phantom, showing an induction bonding apparatus for heating an assembly/bonding nest.

FIG. 15 shows an induction bonding die 80 for applying heat and pressure to a core plate 66 and opposing strips of notched friction materials 10 and 10', In the embodiment shown in FIG. 15, the induction bonding die 80 generally comprises an upper ceramic pressure plate 82 having extending therethrough at least one induction coil 84. A phenolic insulator plate 86 separates the induction coil 84 and the upper ceramic pressure plate 82 from an upper die plate 87 of the induction bonding die 80. The induction bonding apparatus 80 further comprises a lower die plate 94 and a phenolic insulator plate 96 which is operatively mounted thereto. A lower ceramic bond die 98 is positioned adjacent the phenolic insulator plate 96. The lower ceramic bond die 98 defines a recess 100 for receiving the length of notched friction material 10, the core plate 66, and the opposing length of friction material 10' (not shown). The induction bonding die 80 is placed into a conventional hydraulic press (not shown) and when energized, the upper ceramic pressure plate 82 is brought into mating contact with the lower ceramic bond die 98 to provide heat and pressure to the friction materials 10 and 10' and core plate 66. After the friction materials 10 and 10' are bonded to the core plate 66, a ceramic ejector plate 104 operatively ejects or removes the bonded clutch plate. The ejector plate 104 is operatively connected to a suitable means such as a pneumatic moveable means 106 which moves the ejector plate 104 in a direction toward the upper ceramic pressure plate 82 after the upper ceramic pressure plate 82 has been moved to an open position. It is to be understood that various other apparatuses are useful to place, and then remove, the friction materials 10 and 10' and core plate 66 from the induction coil apparatus 80.

Figure 16:
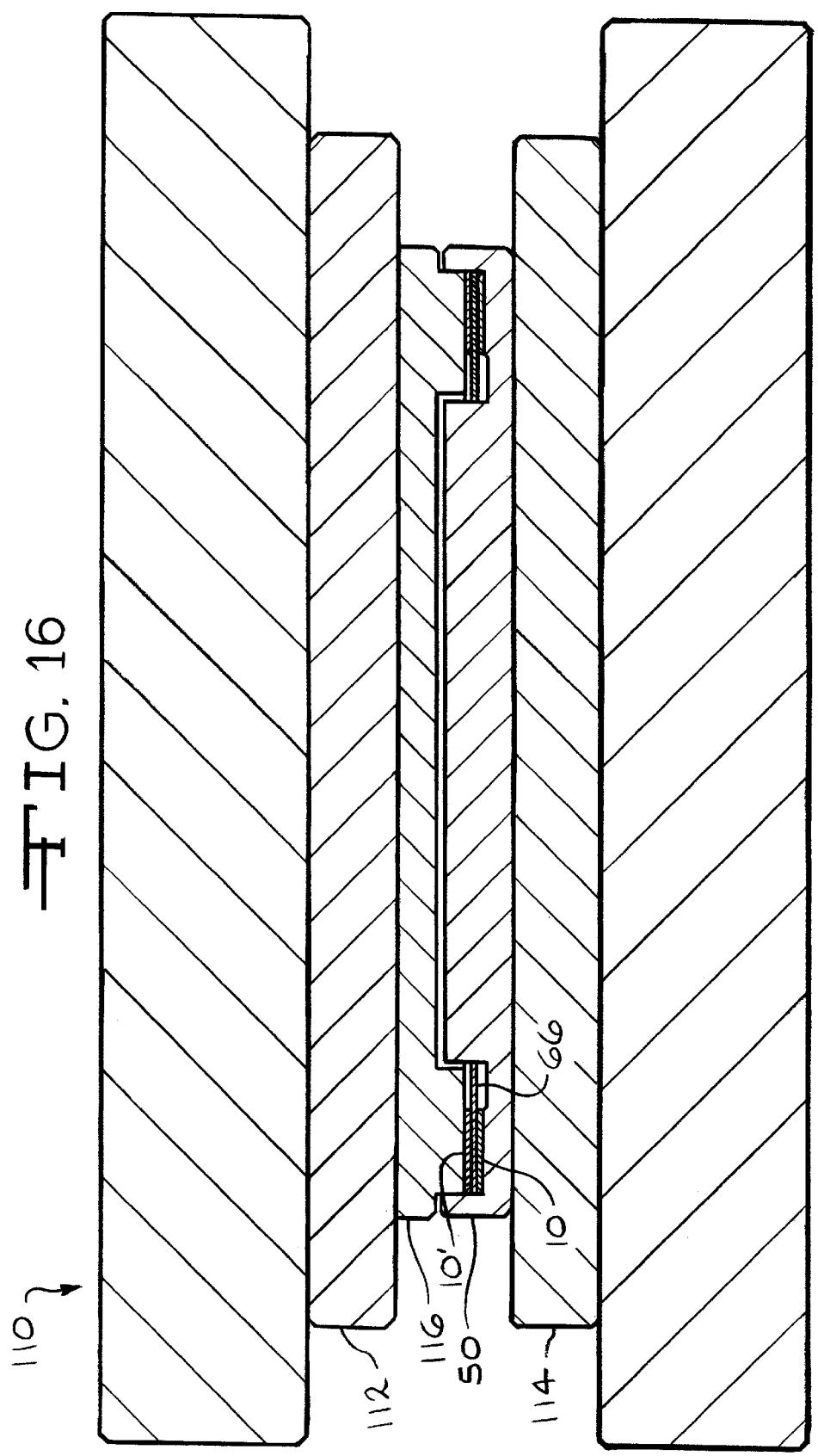
FIG. 16 is a schematic side elevational view, partially in cross-section, showing heating of an assembly/bonding nest using a conduction device.

FIG. 16 shows a conduction heating apparatus 110 comprising a first heated platen 112 and an opposing or second heated platen 114.

The bonded nest assembly 50 (containing opposing friction materials 10 and 10' and a core plate 66 disposed therebetween) is positioned on the heating platen 114. An upper pressure plate 116 is mounted adjacent the upper heated platen 112. The upper and lower heated platens 112 and 114 are brought into mating contact and heat and pressure are applied to cause the length of notched friction materials 10 and 10' to bond to the core plate 66.

Figure 17:
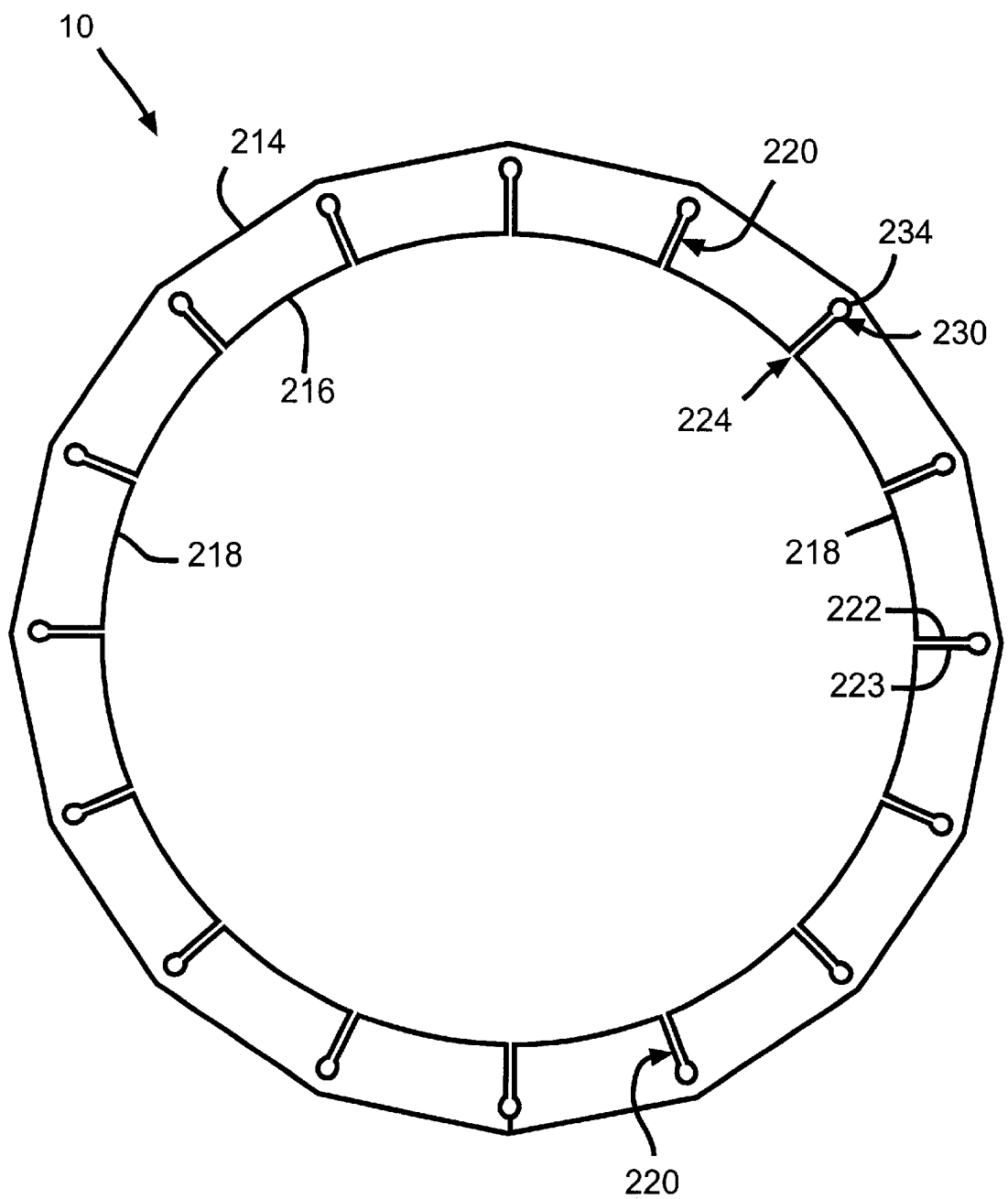
FIG. 17 is a top plan view of a strip of a Λ-notched friction material disposed in a circular shape.

Referring now to FIG. 17, a circumferentially wound friction material 10 of the present invention is shown. The friction material 10 is produced from a continuous strip of a suitable friction material such as a composite or fibered material impregnated with a resin as described above. The friction material 10 has a shape which is die cut so as to use nearly all of the available friction material during the blanking or cutting process.

The friction material 10 has an outer edge 214, an inner edge 216, and a plurality of connected sections 218 which are defined by a desired number of notches 220. The friction material 10 thus comprises a plurality of attached sections 218 separated by individual notches 220.

Each notch 220 radiates from the inner edge 216 in a direction toward the outer edge 214.

Figure 18:
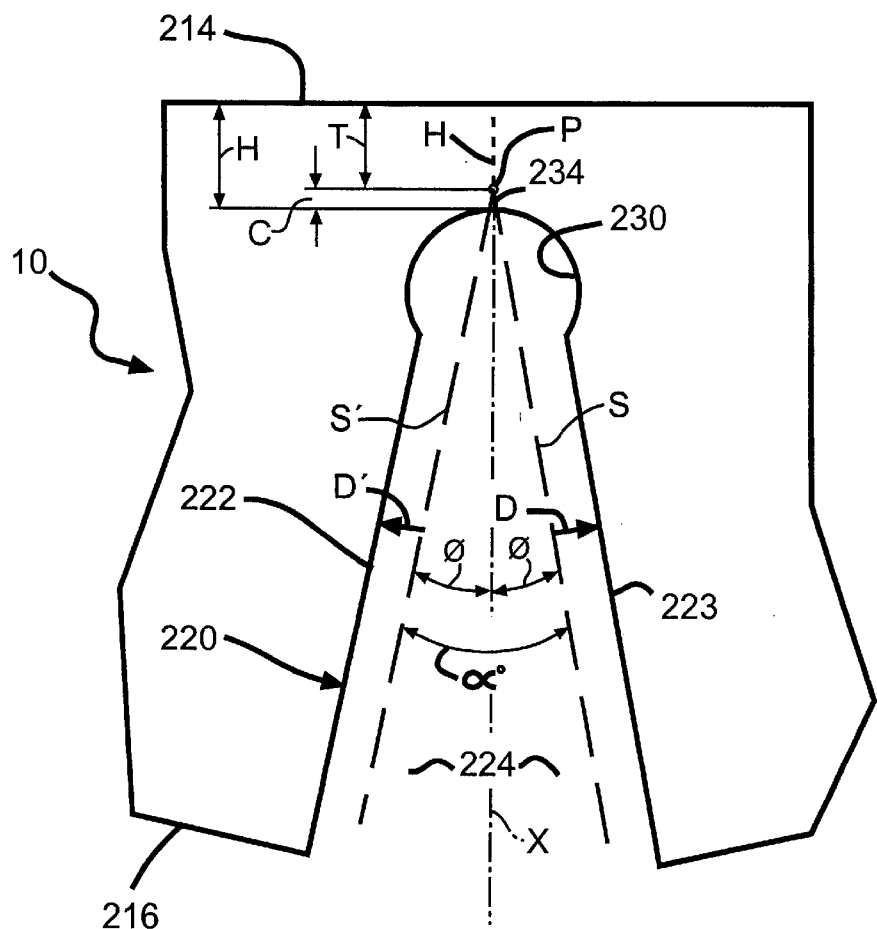
FIG. 18 is a schematic view of a Λ-notch in the friction material of FIG. 17, prior to being circumferentially wound.
Figure 19:
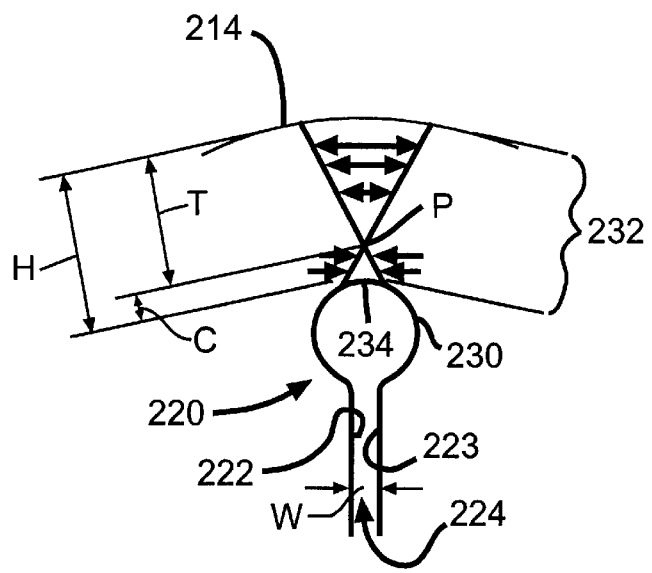
FIG. 19 is a schematic view of an apex of a Λ-notch in the friction material of FIG. 17, as circumferentially wound.

FIGS. 18 and 19 show one preferred embodiment where each notch 220 has a generally Λ-shape such that a first side 222 and a second side 223 of the notch 220 each has substantially the same length; that is, the sides 222 and 223 of each notch 220 extend at the same, yet opposing, angle φ° from the center line X.

The desired number of notches 220 in a friction material 10 is determined by the end use application. The angle α° is determined by dividing the 360° by the number of notches desired. For example, 360°÷16 notches=22.5°.

The sides 222 and 223 of the notch 220 define a groove, or gap, 224. The width (W) of the groove 224, when the friction material 10 is in a circular shape (as shown in FIG. 19), is determined by an offset distance (D). The distance (D) is measured from a side (S) of the angle φ° which extends from an apex point (P) to the side 222 or 223 of the notch 220. Thus, the width (W) equals the sum of the distances (D) and (D'), as shown in FIG. 19.

The notch 220 terminates at an apex 230. In a preferred aspect, the apex 230 has a substantially circular shape. In other embodiments, however, it should be understood that other shapes such as oval, elliptical and the like are also useful and, as such, are within the contemplated scope of the present invention.

The apex 230 has a distal end 234 which terminates at a preferred distance (H) from the outer edge 214. The distance (H) defines a bridge section 232 of the friction material 10. The bridge section 232 extends between the distal end 234 of the apex 230 and the outer edge 214.

Referring now to FIG. 18, the bridge 232, which has the distance (H) as defined by the outer edge 214 and the distal end 234 of the apex 230, is schematically shown. The shape of the apex 230 prevents the bridge section 232 from fracturing or separation; that is, when the friction material is in a circular shape a portion (C) of the bridge section 232 is compressed, while a portion (T) of the bridge section 232 is stretched, or under tension. The compressed portion (C) extends from the apex point (P) to the distal end 234 of the apex 230. The tensioned portion (T) extends from the apex point (P) to the outer edge 214 of the friction material 10.

In a preferred embodiment, the apex 230 has a diameter that ranges from about 0.75 mm to about 1.25 mm. The height, or distance, (H) is preferably about 0.75 mm to about 1.5 mm. The compressed portion (C) is between about 20 to about 40% of the distance (H), while the tensioned portion (T) is between about 60 to about 80% of the distance (H). For example, in certain embodiments where (H) ranges from about 0.75 to about 1.5 mm, the compressed portion (C) has a length that ranges between about 0.15 mm to, about 0.60 mm, while the tensioned portion (T) has a length that ranges between about 0.45 mm to about 1.2 mm.

The bridge section 232 preferably has the above described desired geometry since, if the bridge section 232 is too large, the friction material tears inconsistently, and, if the bridge section 232 is too small, the friction material is too weak. The shape of the apex 230 allows for controlled and consistent forming of the friction material 10. The bridge section 232 provides a spring action to the Λ-notched friction material 10 when the Λ-notched friction material 10 is formed into a circular shape and placed into a friction plate bonding nest.

The Λ-notched friction material tends to maintain its straight shape such that, when the Λ-notched friction material is circumferentially positioned in the bonding nest 50, as shown in FIG. 12, there is an outward force or spring-type action applied against the side wall 58 of the bonding nest 50. The outer edge 214 of the Λ-notched friction material 10 is pressed against the interior side wall 58 of the bonding nest 50 to hold the friction material 10 in place without sliding or moving. Also, the spring-type force maintains the desired spacing between the sections 218 of the friction material such that the width of each groove 224 in the friction material 10 is consistent.

The Λ-notched friction material 10 is a unitary piece, as compared to the multiple friction segments. The unitary Λ-notched friction material 10 does not require delicate handling and does not require the handling of many prior art type individual segments that had to be individually and carefully positioned on the core plate.

The spring action of the Λ-notched friction material 10 allows the friction material 10 to be placed in the bonding nest without concern that the friction material 10 will fall out of the bonding nest. Further, no preadhesion of the friction material 10 to the core 66 is necessary during handling and assembly of the core plate, prior to the bonding step.

The sides 222 and 223 of the notch 220 are configured to create a desired fluid flow pattern in the groove 224 when the friction material 10 is circumferentially adhered to the clutch plate 66. The radially extending groove 224 creates a desired hydrostatic pressure as fluid flows into the groove 224 and terminates in the apex 230. This pressure head in the groove 224 and apex 230 is intended to assist in separating the clutch plates 66. Upon release of the clutch, the pressure also acts to eliminate parasitic drag when the plates are released and separated. The sides 222 and 223 of the groove 224 can be oriented so that, for instance, the groove 224 has substantially parallel sides, as shown in FIG. 17, when formed into a circular shape.

Figure 20:
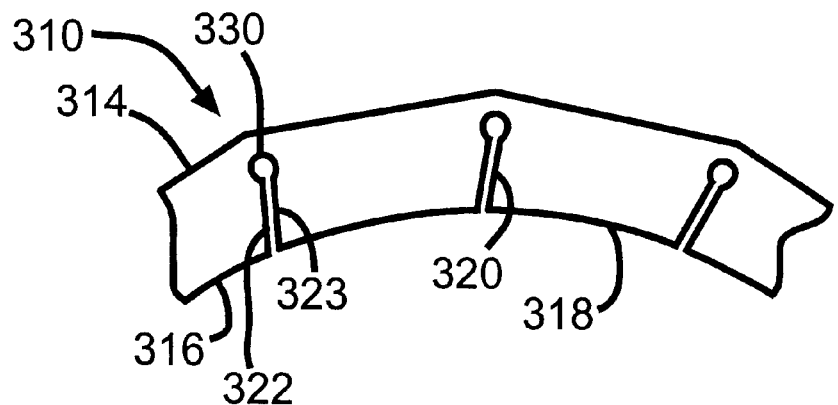
FIG. 20 is a partial plan view of a part of an alternative embodiment of the Λ-notched friction material of the present invention.

Referring now to FIG. 20, an alternative embodiment of a friction material 310 is shown where the friction material 310 has an outer edge 314, an inner edge 316 and a plurality of connected sections 318. The friction material 310 includes a plurality of off-centered Λ-shaped notches 320 which define the connected sections 318. Each notch 320 radiates from the inner edge 316 to the outer edge 314. A first side 322 of the notch 320 has a shorter length than a second side 323 of the notch 320. Each notch 320 terminates at an apex 330, as described above with respect to the apex 30 in FIG. 17.

Figure 21:
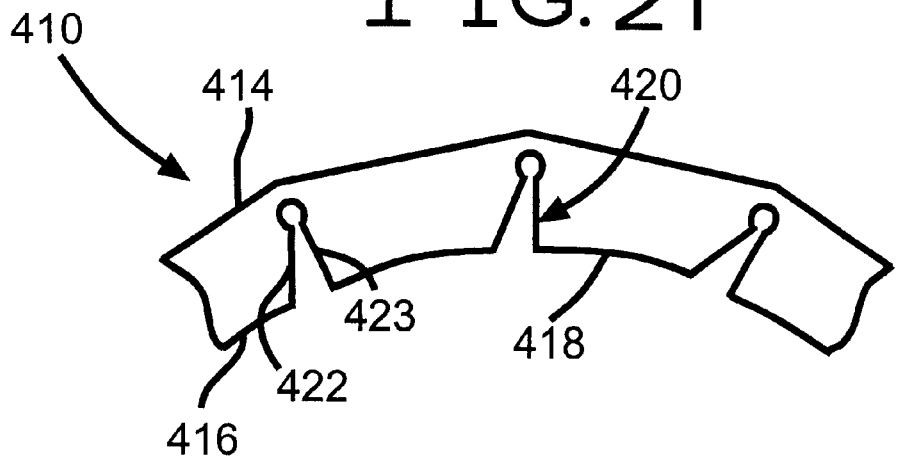
FIG. 21 is a partial plan view of a part of an alternative embodiment of the Λ-notched friction material of the present invention.

Referring now to FIG. 21, another embodiment of the invention is shown where a friction material 410 has an outer edge 414, inner edge 416 and a plurality of connected sections 418. The friction material 410 is provided with a desired number of notches 420 which define the connected sections 418. Each notch 420 radiates from the inner edge 416 in a direction toward the outer edge 414. In the embodiment shown in FIG. 6, the notch 420 has an off-centered Λ-shape such that a first side 422 of the notch 420 extends in an offset rearward direction from the inner edge 416 toward the outer edge 414. A second side 423 extends in a generally straight radial direction toward the outer edge 414 when the friction material 410 is circumferentially placed on a clutch plate (not shown). Each notch 420 terminates at an apex 430, in a manner as generally described above.

In each of these embodiments, the pressure created in the groove 224 between the sides 222 and 223 of the notch 220 provides an appropriate pumping action to press fluid into the groove 224, thereby creating, a pressure head in the groove 224 and in the apex 230. The amount of angled orientation between the sides 220 and 223 of the notch 220 is determined by the amount of cooling fluid flow desired and the amount of pressure build-up desired. The friction material 10 of the present invention is easily adaptable to pumping oil radially outward at different rates depending on the orientation of the notches. The friction material produces a large pressure build up due to the apex on the Λ-shaped notch. The friction material is universally applicable to any desired objective, depending on its relative orientation and the direction of rotation of the plate.

Figure 22:
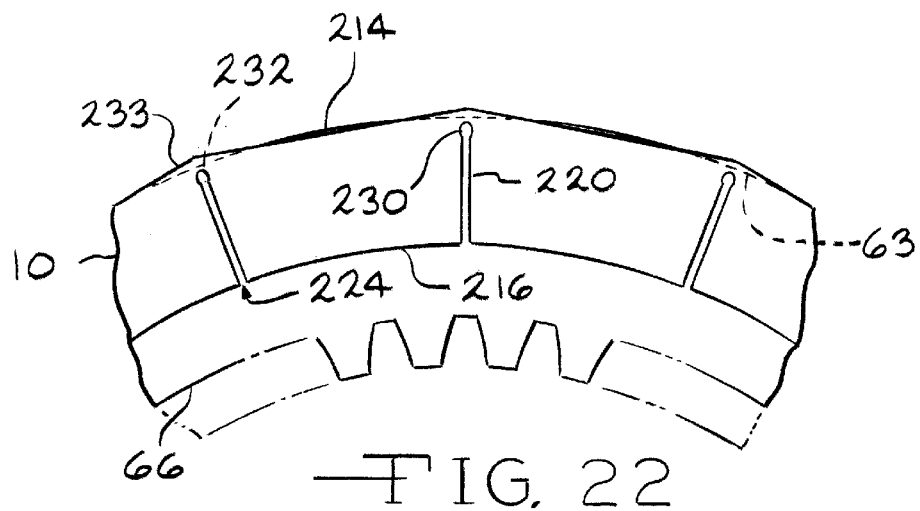
FIG. 22 is a partial plan view, partially in phantom, of a Λ-notched friction material on a core plate.

In contrast to the embodiment shown in FIG. 11, where the outer edge 214 of the bridge section 232 is adjacent and coterminous with the edge 63 of the core plate 66, FIG. 22 shows another embodiment where the core plate 66 has the friction material 10 bonded thereto beyond the edge 63 of the core plate 66. In certain bonding processes, the friction material 10 is positioned on the core plate 66 such that an overhang portion 233 of the bridge section 232, which is adjacent the apex 230, extends beyond the outer edge 63 of the core plate 66.

It is to be noted that, in the embodiment shown in FIG. 11, the bridge 232 of the friction material 10 is coterminous with the edge 63 of the core plate 66. The notch 220 defines the groove 224 which is a full depth, dead end or closed groove 224. The closed end groove 224 eliminates passage of fluid through the groove 234, which is especially useful in low lubrication applications.

Figure 23:
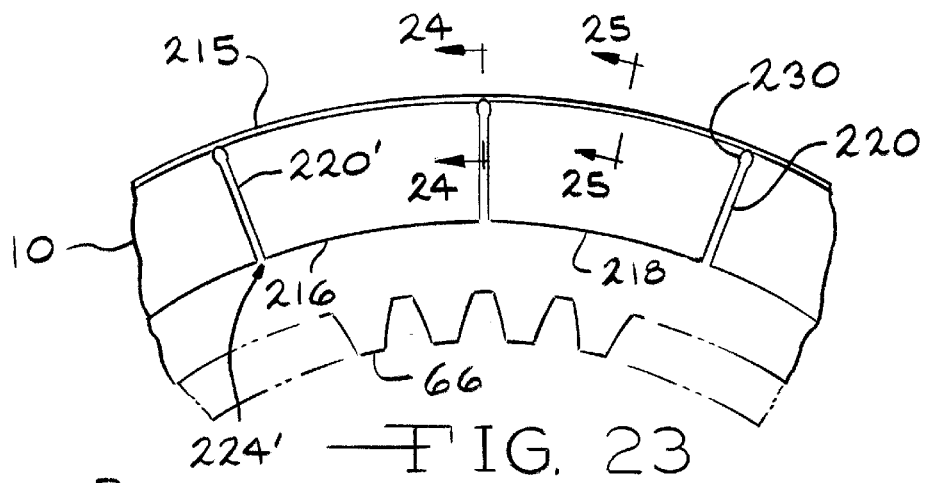
FIG. 23 is a partial plan view, partially in phantom, of a friction material on a core plate, and showing chamfering of an outer edge or circumference of the friction material.
Figure 24:
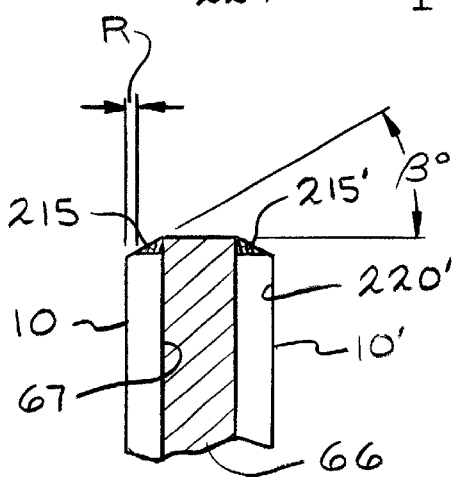
FIG. 24 is a view taken along the line 24—24 in FIG. 23.
Figure 25:
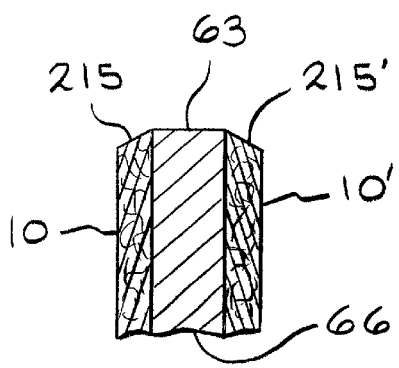
FIG. 25 is a view taken along the line 25—25 in FIG. 23.

In other applications it is desired to have a predetermined amount of fluid flow through the grooves 224. FIG. 23 shows the friction material 10 bonded to the core plate 66 where at least a portion of the overhang portion 233 of the outer edge 214 of the friction material 10 is removed. In certain preferred embodiments, a predetermined amount of the outer edge 214 (i.e., the overhang portion 233) is removed by being chamfer sanded. The notch 220 thus defines a groove 224' that is partially restricted. The restricted opening groove 224' allows a limited, or restricted passage of fluid through the groove 224', FIG. 24 shows a cross-sectional view through a chamfer sanded notch 220', FIG. 25 shows a cross-sectional view through the "chamfer-sanded" removed friction material 10 from the one of the connected sections 218 of the friction material 10. The removed friction materials 10 and 10' now define angled faces 215 and 215', respectively. The desired amount of friction material remaining bridge section R is shown as the distance between the arrows in FIG. 24. The amount of chamfer-sanded removed material is removed by sanding the friction material 10 at an angle β°. The angle β° is measured from a line perpendicular to a plane defined by the annular surface 67 of the core plate 66. In certain embodiments, the angle β° at which the friction material is removed is between about 25 to about 35°, and most preferably about 30°.

In still other applications, it may be desired to fully open the grooves 224. In such applications, the amount of remaining bridge material R is zero; that is the entire thickness of the friction material 10 is removed.

Table 1 below shows the friction material utilization for various conventional art friction facing materials as compared to the edge wound notched material of the present invention. As can readily be seen, the present invention provides for more efficient utilization of the friction material than the conventional materials.

TABLE 1

Material Utilization Comparison
Friction Plate with OD = 146 mm, ID = 121 mm

| | |
|---|---|
| Conventional 2-out Full ring Blanking = | 25% |
| Conventional 3-Segment Facing = | 54% |
| Conventional 20 Segment Multisegment = | 78% |
| Edge Wound Notched Material of Invention = | 88% |

It is to be noted that conventional, full ring blanking of friction material typically yields 25% material utilization (25% of the manufactured friction material ends upon the clutch plate and 75% ends up in landfills). In comparison, with the edge wound notched strip of friction material of the present invention, the material utilization is generally determined as follows: Final Friction Area/Material Consumed= $\pi RO^2 - \pi Ri^2$/(Strip Length×Strip Width)=5,362 mm$^2$/6,129 mm$^2$=88%.

EXAMPLE I

For calculations for a Λ-notched friction material:

O.D.=146.15 mm (5.7539")

I.D.=120.55 mm (4.7461")

True circumference of round facing=πO.D.=5.7539π= 18.077" The edge-wound friction material does not have a radiused O.D. but instead, a series of straight lengths of friction material. For a 16 notch design, as seen in FIG. 17, 360°/16=22.5°.

H=radius of part=5.7539/2=2.877"

Without stretch or tear at corner of Λ-notch, pitch would be =2×0

(opposite)

0/2.877=SIN 11.25°

0=2.877 SIN 11.25°

0=2.877 (0.1951)

0=0.5613"

2(0)=1.1225"

True perimeter with 16 straight lengths and without stretch or tear=16 ×1.1225=17.9608".

For this example, it is estimated that 70% of the material will stretch or tear and 30% will compress.

70%×0.060"=0.042"

Estimated Ro$_{p1}$=2.877–0.042"=2.835"

O.D.$_{p1}$=2πRo$_{p1}$=17.813

Notch Pitch=17.813÷16=1.1133

EXAMPLE II

A direct/intermediate clutch plate was chosen as the part to tool and evaluate. All samples were produced with production glued core plates, production friction materials (4 grades), and production bonding nest (except induction bond samples).

The progressive blanking die 8 was used to blank the notches and the inside edge of the friction material. The outer edge remains straight and becomes the outside diameter of the friction material. The notch geometry, at least in part, determines the resulting oil groove width and how well the strip of friction material conforms to the bonding nest. The bonding nest 50 is used to concentrically align the friction material 10 with the preglued core plate 66. The pitch, or number, of Λ-notches in friction material also has an influence on how well the circular formed friction material conforms to the bonding nest. The Λ-notched friction material was formed into a 360° ring, and inserted into a bonding nest.

In various experiments, the depth, or length, of the notch was varied, producing bridge section widths varied from 0.50 to 1.80 mm. In one embodiment, the blanked Λ-notched friction materials were most stable (not easily broken down) when the bridge section had a width of about 0.70 to about 1.50, and most preferably at least about 0.75 to about 1.0 mm. One particularly useful friction material has a bridge section width of about 1.14 mm and a radius of the apex of the notch of about 1.02 mm.

The Λ-notched edge wound friction plate is manufactured consistently using the blanking, assembly and bonding methods as generally described herein. The manufacturing process can be performed separately in batches or can be integrated into a fully automated process. An automated process results in further significant cost reductions due to the efficient use of friction material, and also due to the low cost of the machine assembly as compared to a labor intensive manual process. The process is also more reliable than the conventional multi-segment processes because there is no need to apply additional adhesives to the plate and/or friction material.

According to the present invention only three components are being assembled together: the first friction material, the core plate and the second, opposing friction material. In contrast, for example, in certain prior art processes such as the multisegment processes, 41 separate components are used; one core plate and 20 segments on each side of the core plate.

Further, according to the present invention, the core plate does not have to be turned or flipped over in the assembly process, unlike with the multisegment plate process. Rather, the friction material/core plate assembly is bonded in the same nest as it was assembled.

Yet another advantage of the present invention is that the Λ-notched grooves created by the notches blanked into the strip of friction material eliminate the need for separate (and expensive) mill grooving or molding operations.

Still another advantage is that the Λ-notched grooves provide important performance advantages over the conventionally designed clutch plates, specifically in reduced drag, reduced hot spotting, and increased friction coefficient. These performance improvements are especially enhanced in low lubrication flow applications.

EXAMPLE III

The results of MuPVT, Drag, T-N, and Hot Spot design verification tests performed on friction plates utilizing the unitary, circumferentially edge wound Λ-notched friction materials (both with dead end, closed grooves and with partially opened grooves) are shown below.

Figure 26:
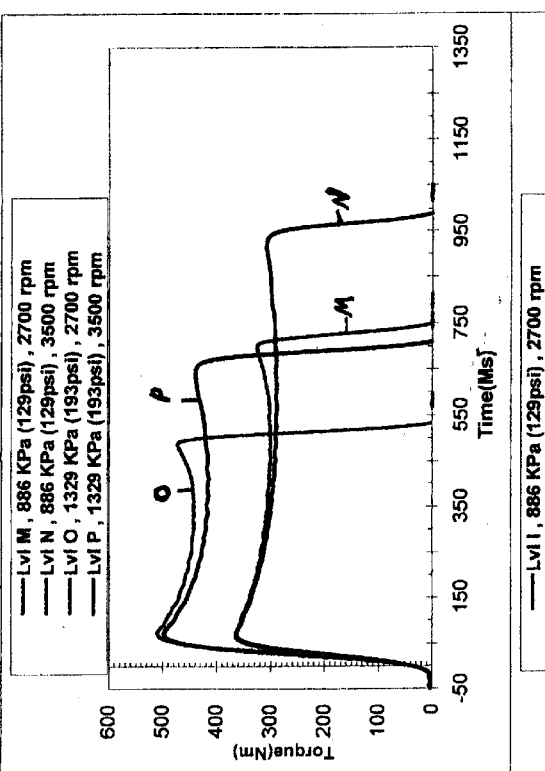
FIGS. 26A–D are graphs showing the SAE MuPVT test (981D) for Λ-notched friction material with full depth, dead end grooves (i.e., no exits).
Figure 26:
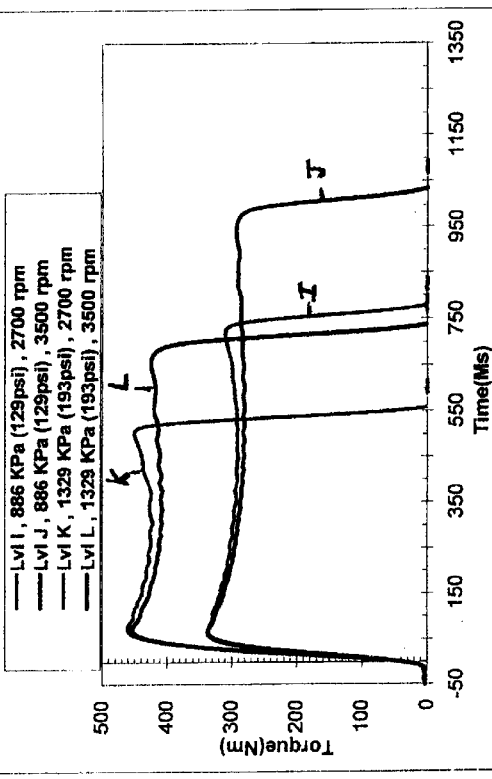
Figure 26:
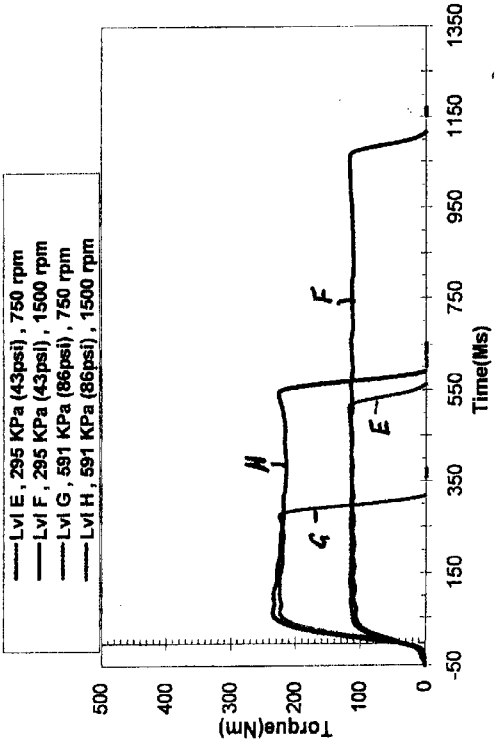
Figure 26:
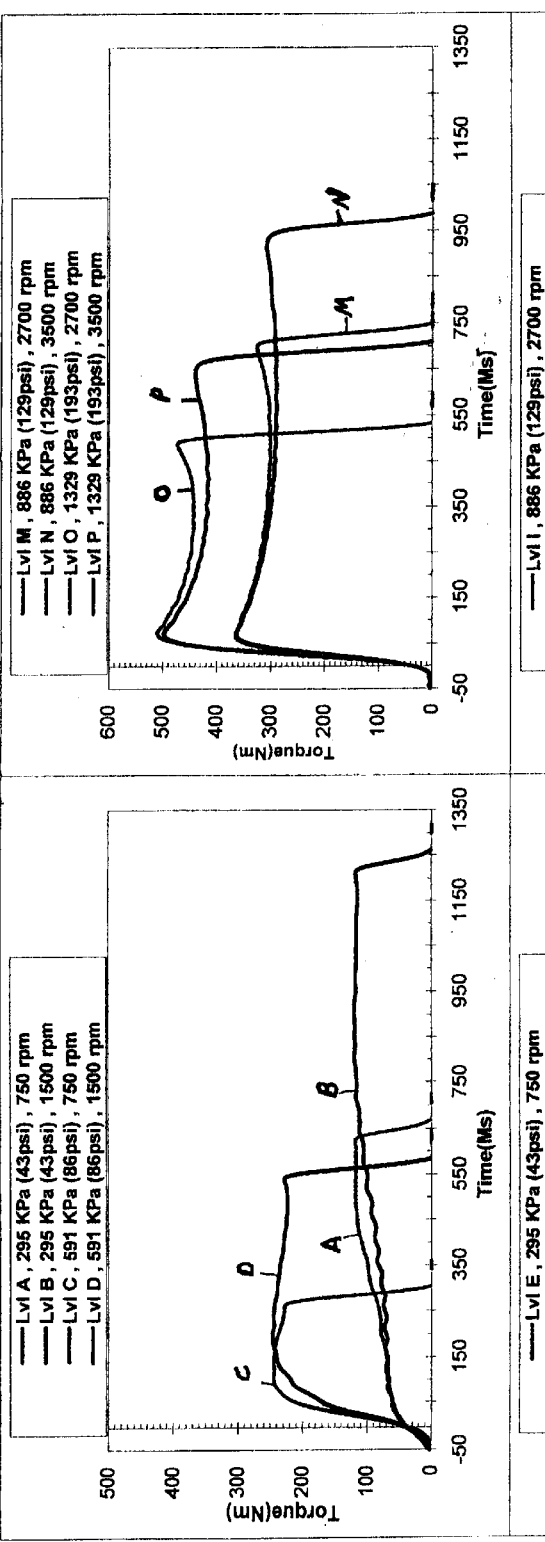
Figure 27:
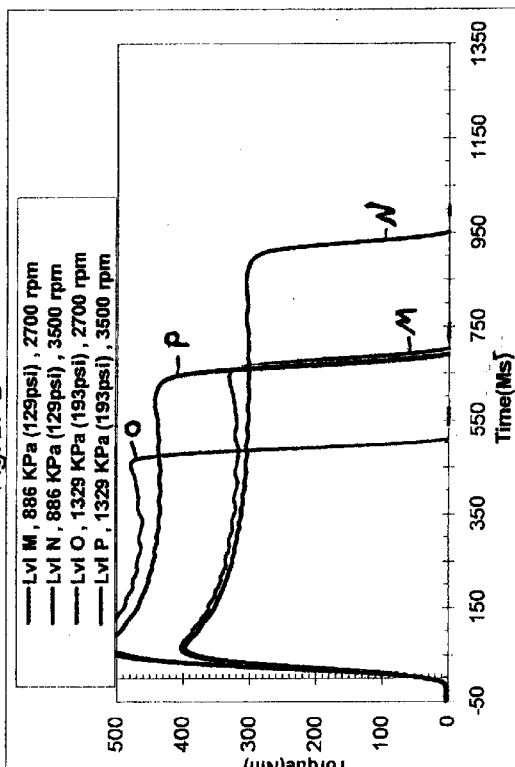
FIGS. 27A–D are graphs showing the SAE MuPVT test (981D) for a Λ-notched friction material with chamfer sanded edges.
Figure 27:
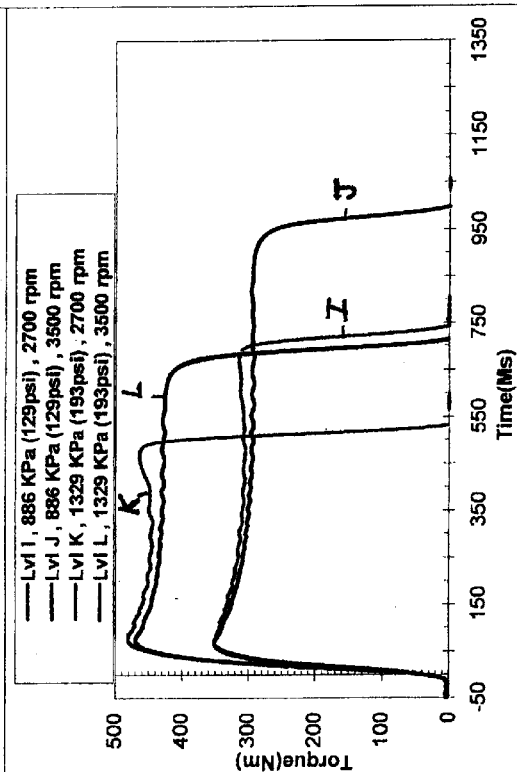
Figure 27:
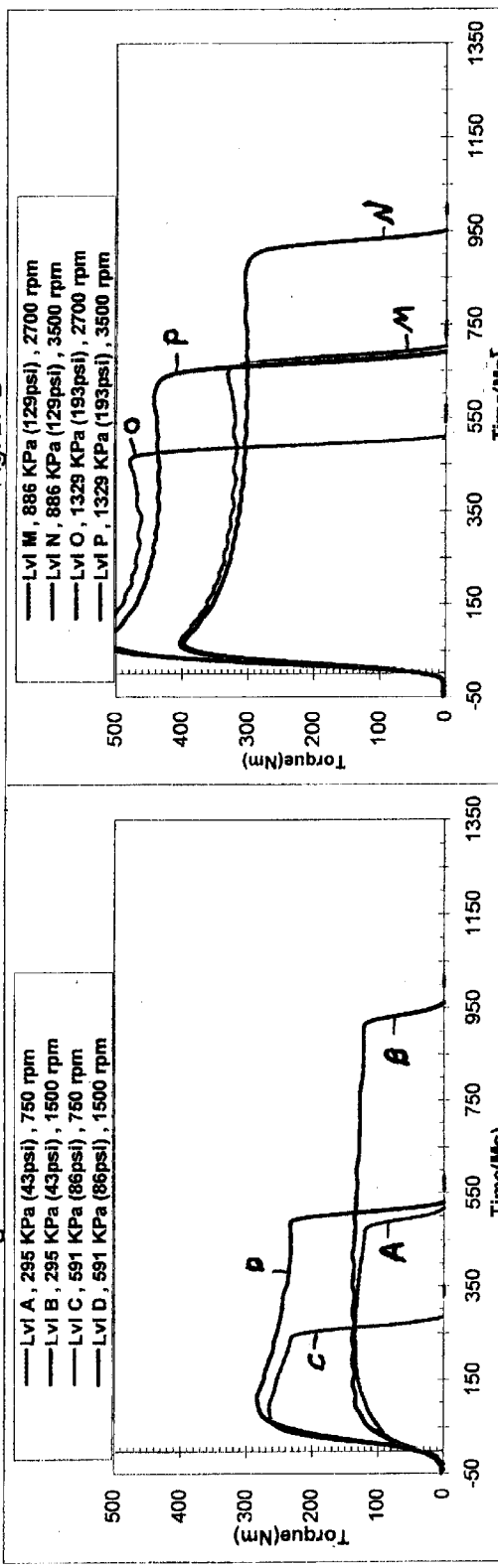
Figure 27:
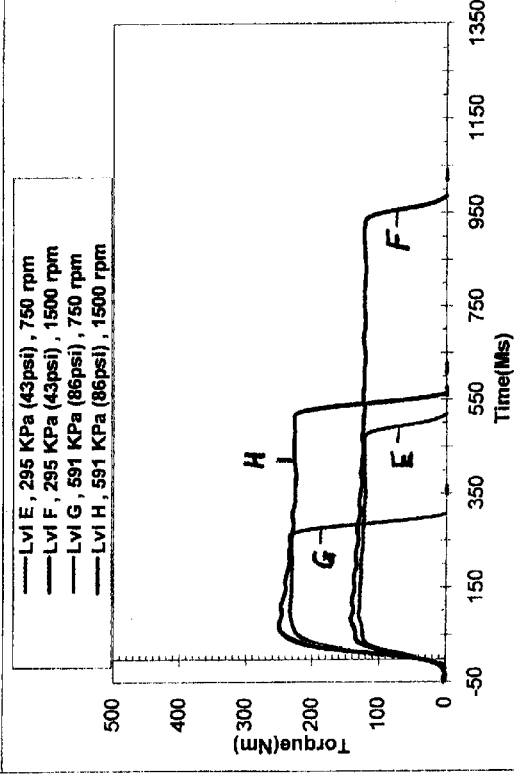
Figure 28:
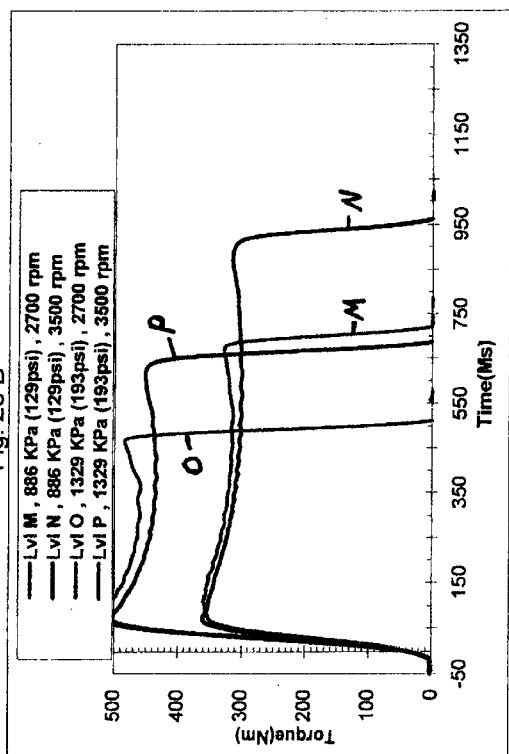
FIGS. 28A–D are graphs showing the SAE MuPVT test (981D) for a Λ-notched friction material with full depth, dead-end grooves (i.e., no exits).
Figure 28:
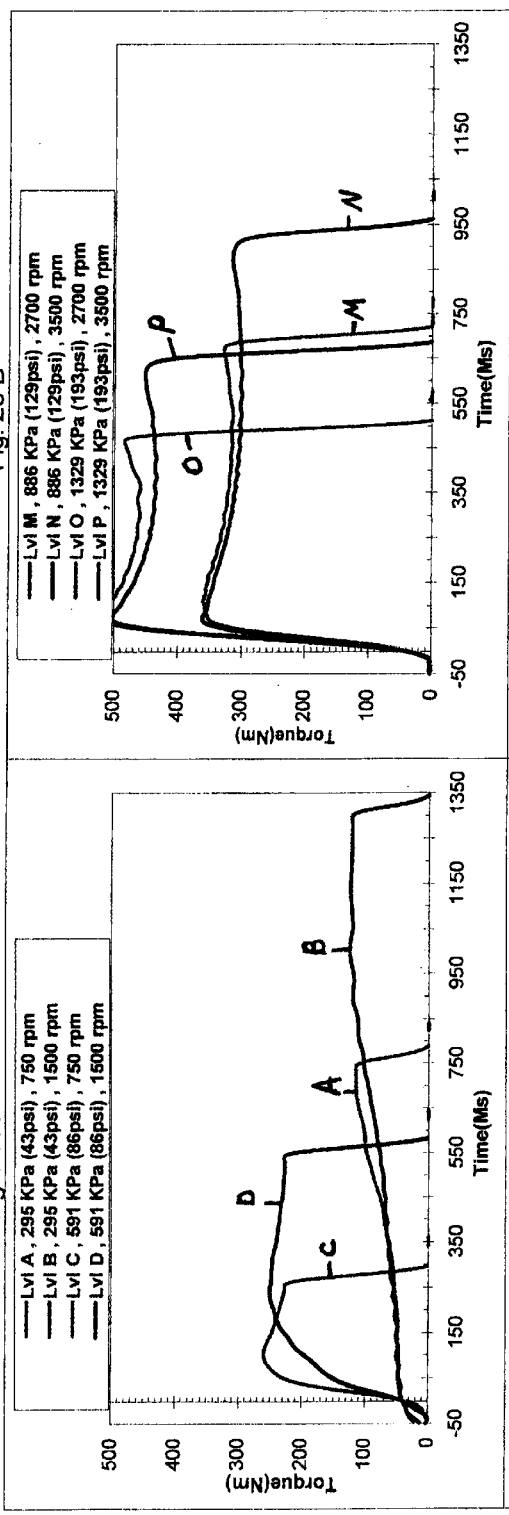
Figure 28:
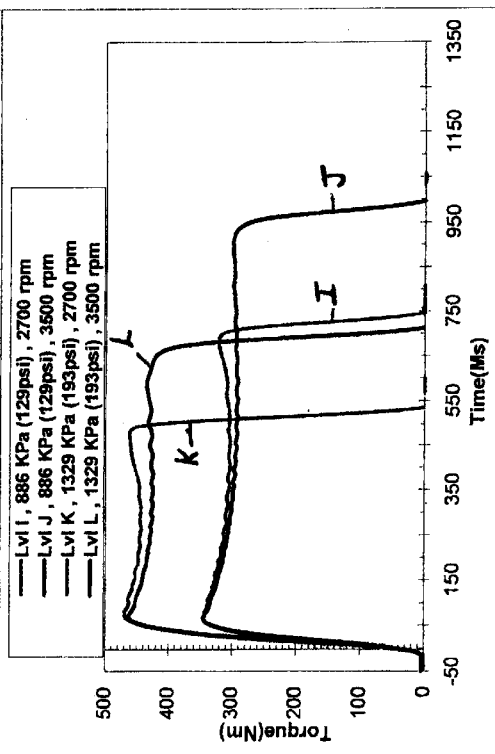
Figure 28:
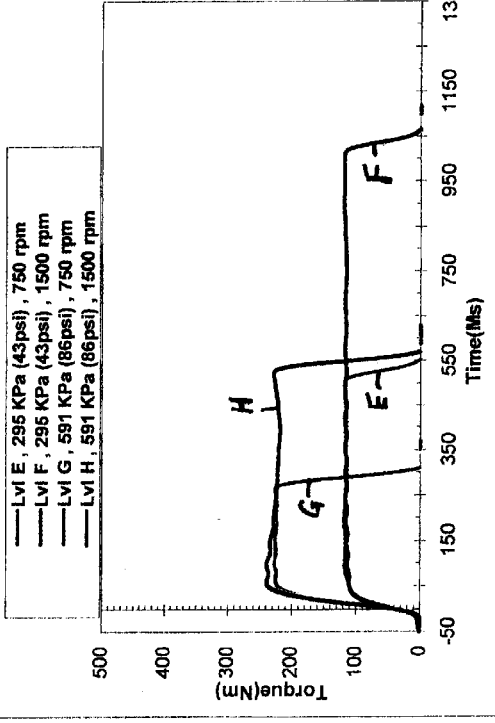
Figure 29:
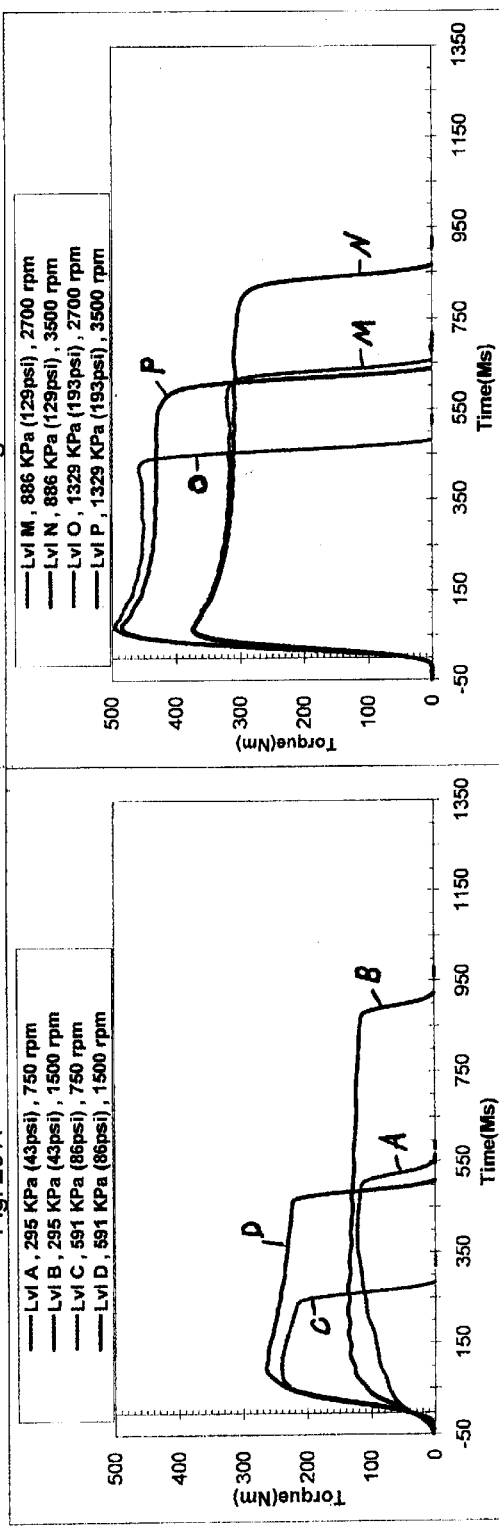
FIGS. 29A–D are graphs showing the SAE MuPVT test (981D) for a Λ-notched friction material with chamfer sanded edges.
Figure 30:
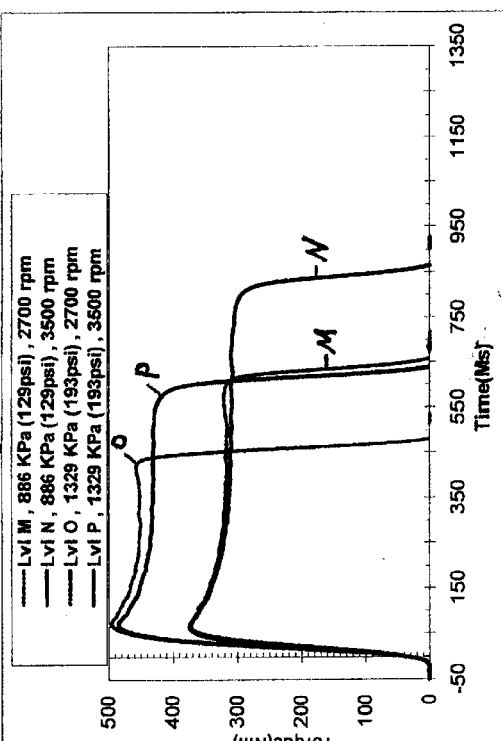
FIGS. 30A–D are graphs showing the SAE MuPVT test (981D) for a Λ-notched friction material with full depth, dead-end grooves (i.e., no exits).
Figure 30:
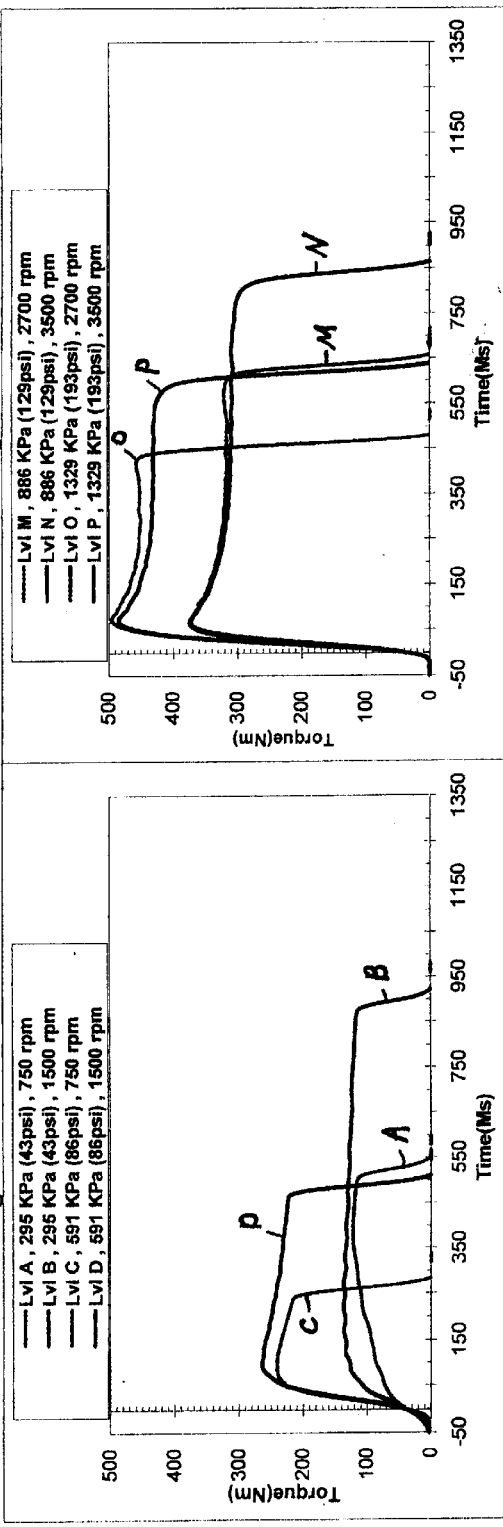
Figure 30:
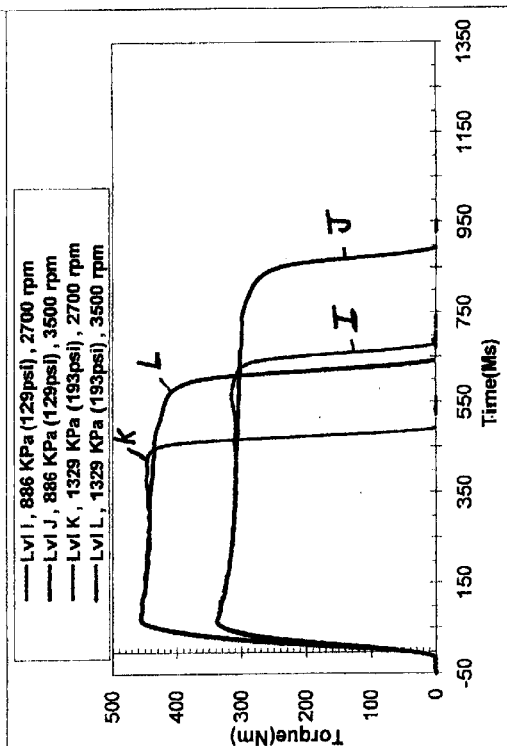
Figure 30:
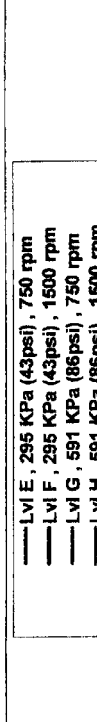

FIGS. 26–31 show standard SAE (981D) MuPVT test results for friction materials with exits, FIGS. 27, 29 and 31, (or restricted openings) and without exits, FIGS. 26, 28 and 30, (dead end, closed grooves). The materials tested were BW 4501 using a standard fluid, standard reaction plate with temperatures at 50° C. (for FIGS. 26A, 26B, 27A, 27B, 28A, 28B, 29A, 29B, 30A, 30B, 31A and 31B) and at 110° C. (for FIGS. 26C, 26D, 27C, 27D, 28C, 28D, 29C, 29D, 30C, 30D, 31C, and 31D). Due to a suppressed initial torque, the core plates with grooves that dead-end at the OD produced extended stop times at low temperature (50C) and facing pressure (295 kPa). This same effect is present at 591 kPa, but to a lesser degree. Under the other conditions of the test (Procedure 981D), the Λ-notched friction material clutch plates perform similarly to conventional cut parallel grooved plates. When the Λ-notched grooves are modified so as to create exits at the OD, the performance is satisfactorily comparable to conventional cut parallel grooved plates, under all test conditions. Also, the initial and midpoint coefficients are higher with the restricted exit notched friction material design.

Figure 32:
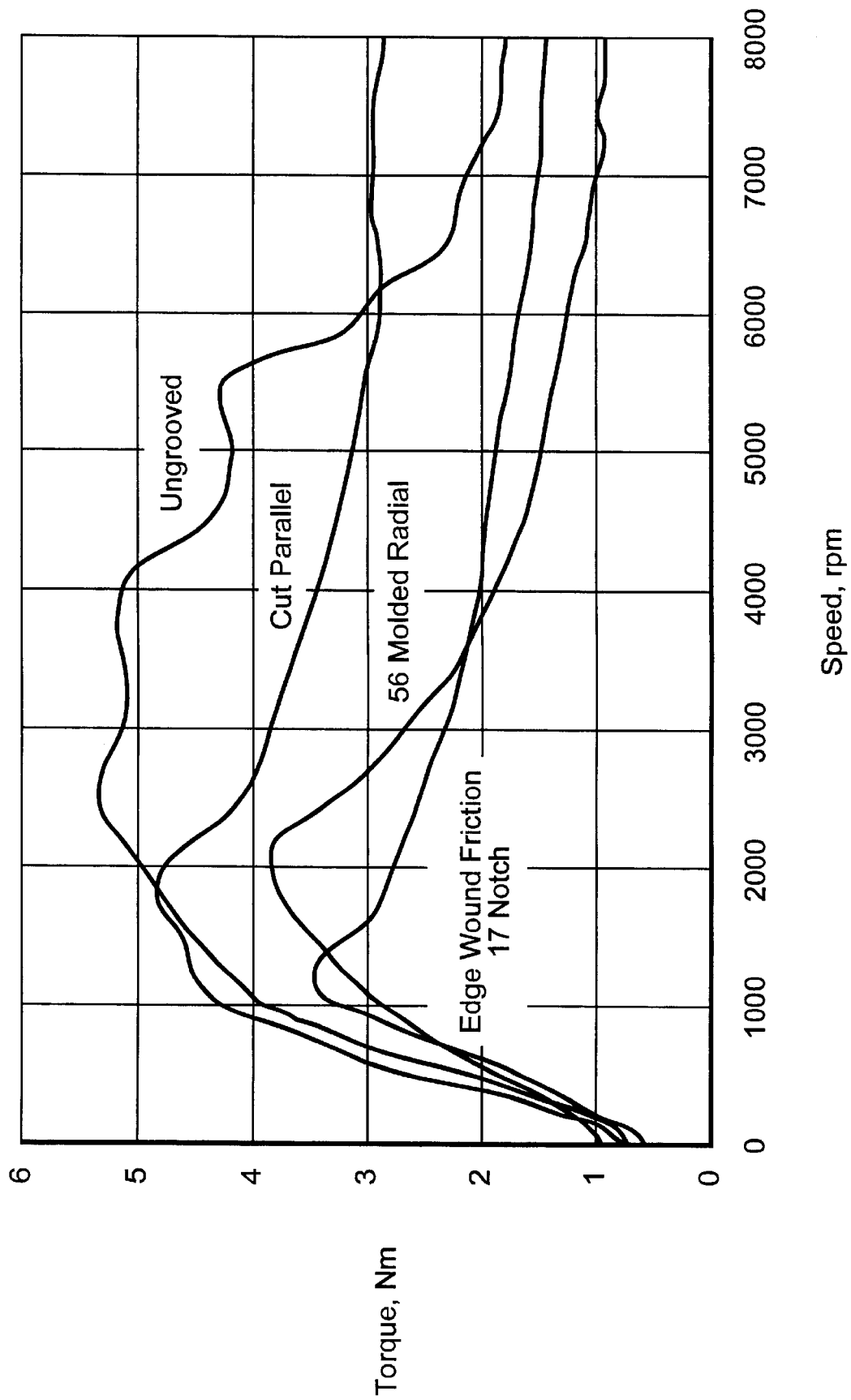
FIG. 32 is a graph showing the results of drag tests for Λ-notched friction materials, as compared to conventional non-grooved, 25 cut parallel and 56 molded radial friction materials.

FIG. 32 shows the drag test results: comparing the open pack drag characteristics of the unitary, notched friction material (with exits), to that of plates with no grooves, plates with 56 molded radial grooves, and plates with 25 cut parallel grooves. The unitary notched friction material plates have drag torques which are 10% lower than 56 molded grooves, 28% lower than standard cut groove and 35% lower than ungrooved plates.

Figure 33:
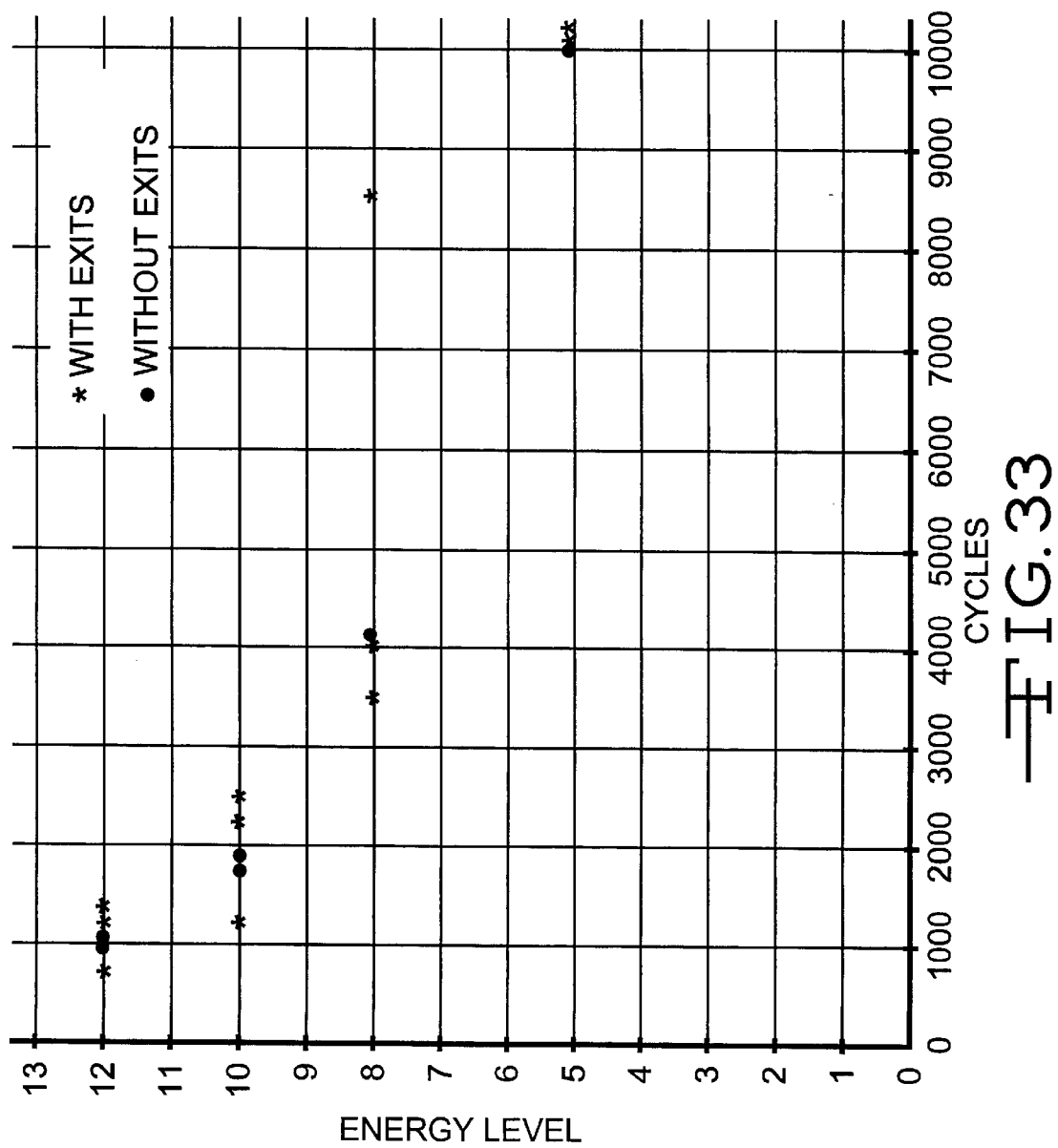
FIG. 33 is a graph showing the results of the SAE (1015A) T-N durability tests for Λ-notched friction materials *with exits and • without exits.

FIG. 33 shows the standard SAE (1015A) T-N test results. No difference in durability between the unitary, notched friction materials (with exits and without exits) was noticed and the notched friction materials are comparable in durability to plates with 25 cut parallel grooves.

Figure 34:
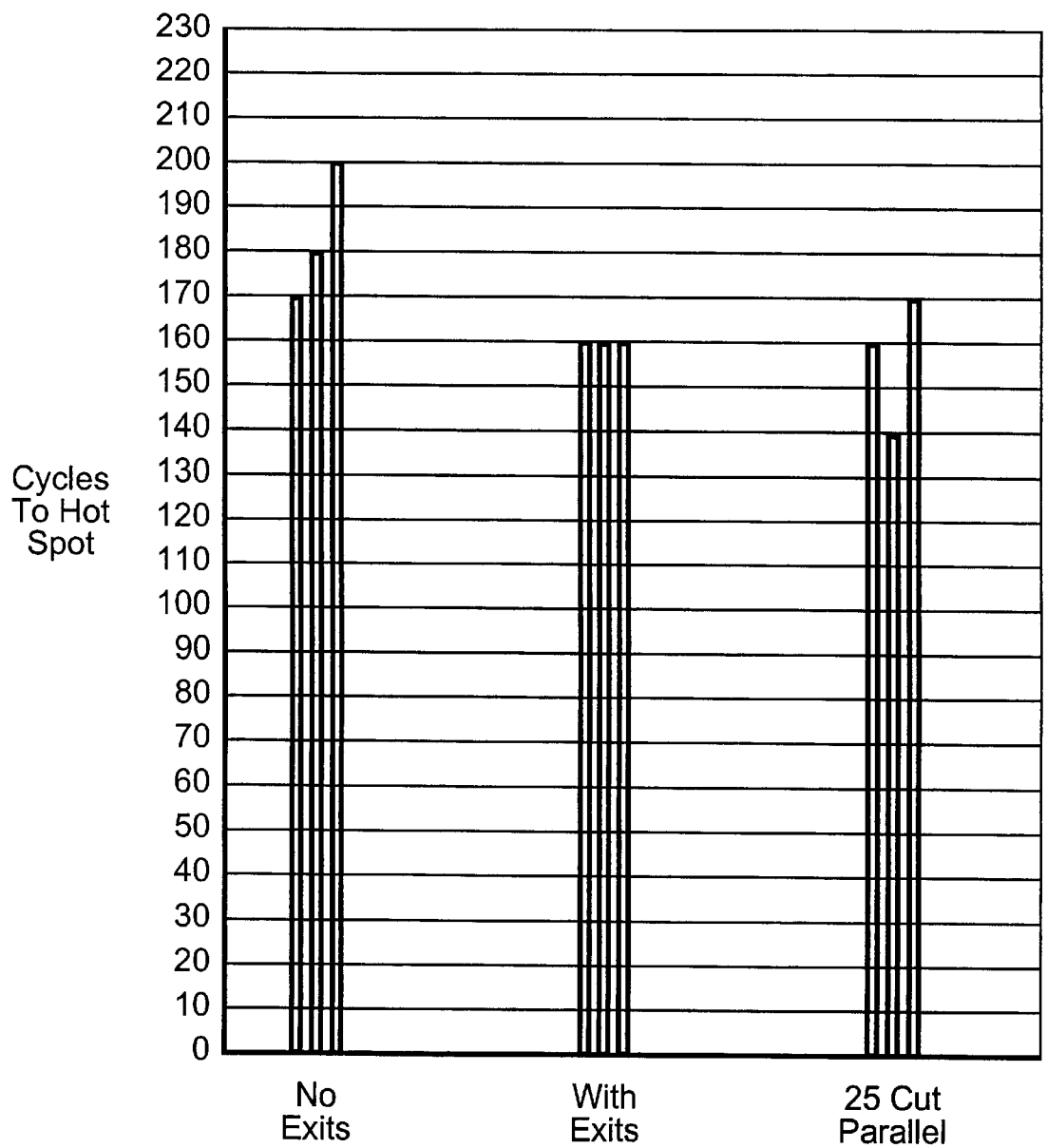
FIG. 34 is a graph showing the results of the SAE (1014) hot spot tests for Λ-notched friction materials with exits and without exits as compared to conventional 25 cut parallel friction materials.

FIG. 34 shows the standard 1014A Hot Spot test results. The unitary, notched friction materials (without exits) have better hot spot resistance than the notched friction materials (with exits). The performance of the unitary, notched friction material (with exits) is comparable to plates with 25 cut parallel grooves.

Overall, clutch plates made with the notched friction material (no exits) and the OD chamfer sanded friction materials (with exits) performed as well or better as the clutch plates with 23 cut parallel grooves.

The method of manufacture described herein has no undesirable properties/characteristics of the finished clutch plate. The standard tests described above were conducted to assess the key characteristics of friction plates, i.e., torque capacity, shift quality, durability, hot spot resistance, and open-clutch spin loss. The test samples were prepared utilizing production intent processes. The baseline plates were standard plates which have 23 cut parallel grooves. Both the test samples and the baseline plates were lined with a production made friction material.

All testing was conducted in Exxon B fluid. A standard SAE friction machine was used in the running of MuPVT Procedure 981, T-N Durability Procedure 1015, and Hot Spot Procedure 1014. The drag testing was performed on a OWC freewheel machine outfitted with genuine transmission hardware.

Figure 35:
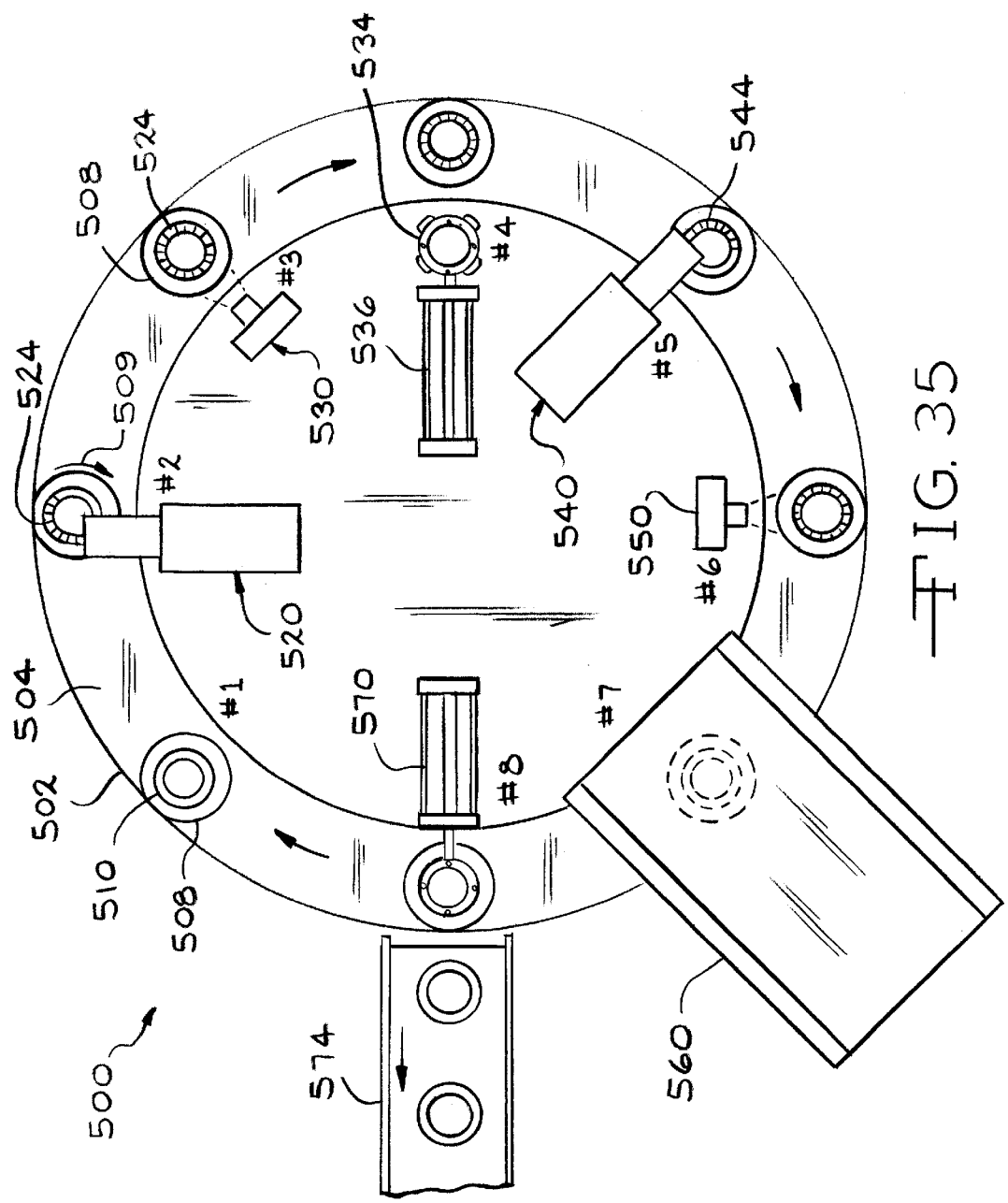
FIG. 35 is a schematic plan view, partially in phantom, of an indexing apparatus for dispensing a Λ-notched friction material.

Referring now to FIG. 35, a schematic view of an apparatus for making a core plate having a Λ-notch friction material thereon is generally provided. The apparatus 500 generally includes an indexing table 502 having a circular or annular top 504 rotatably mounted in a suitable manner, with, for example, a motor (not shown) for rotating the top 504 at a predetermined rate of speed.

A plurality of core platen or bonding nest platforms 508 are rotatably mounted on spindles (not shown) that are positioned on the top 504 of the indexing table 502. Each of the nests 508 is in communication with, for example, a motor (not shown) for rotating the platform 508 as in the direction of arrow 509. In the present embodiment, there are eight platforms 508. However, the number of platforms 508 can vary, depending on the application.

The apparatus 500 includes a plurality of work stations. At Station #1, a bonding nest 510 is inspected for verification of vacancy (i.e., the bonded clutch plate was evacuated in Station #8). At Station #2, a first dispensing apparatus 520 for positioning a first length 524 of notched friction material is positioned adjacent the indexing table 502. The first dispensing apparatus 520 dispenses the first desired length 524 of notched friction material into the bonding nest 510. The nest 510 rotates in the direction of arrow 509 as the friction material 524 is deposited in the bonding nest 510.

The bonding nest 510 with the first length of friction material 524 is advanced to Station #3 where a first suitable inspection device 530, such as a camera, is used to inspect placement of the friction material 524 in the bonding nest 510.

At Station #4, a glued core 534 is loaded by a loading apparatus 536 onto the first length of notched friction material 524 in the bonding nest 510.

At Station #5, a second dispensing apparatus 540 for positioning a second length 544 of notched friction material is positioned adjacent the indexing table 502. The second dispensing apparatus 554 dispenses the second length 544 of the notched material on an opposing side of the core 534.

The nest 508 is further advanced to Station #6 where a second suitable inspection means, such as a camera 550, is used to inspect placement of the second length of friction material 544 on the core 534.

Thereafter, the core 534, having the first and second lengths of friction material 524 and 544, respectively, adjacent the core 534, is advanced to a Station #7 for bonding using, for example, a hydraulic C-frame press 560 with an induction heated die to set the glue and bond the notched friction materials 526 and 546 to the core plate 534.

Thereafter, the bonded friction plate is advanced to Station #8 where a conveyor device 570 removes the bonded plate 534 onto a conveyor means 574.

Figure 36:
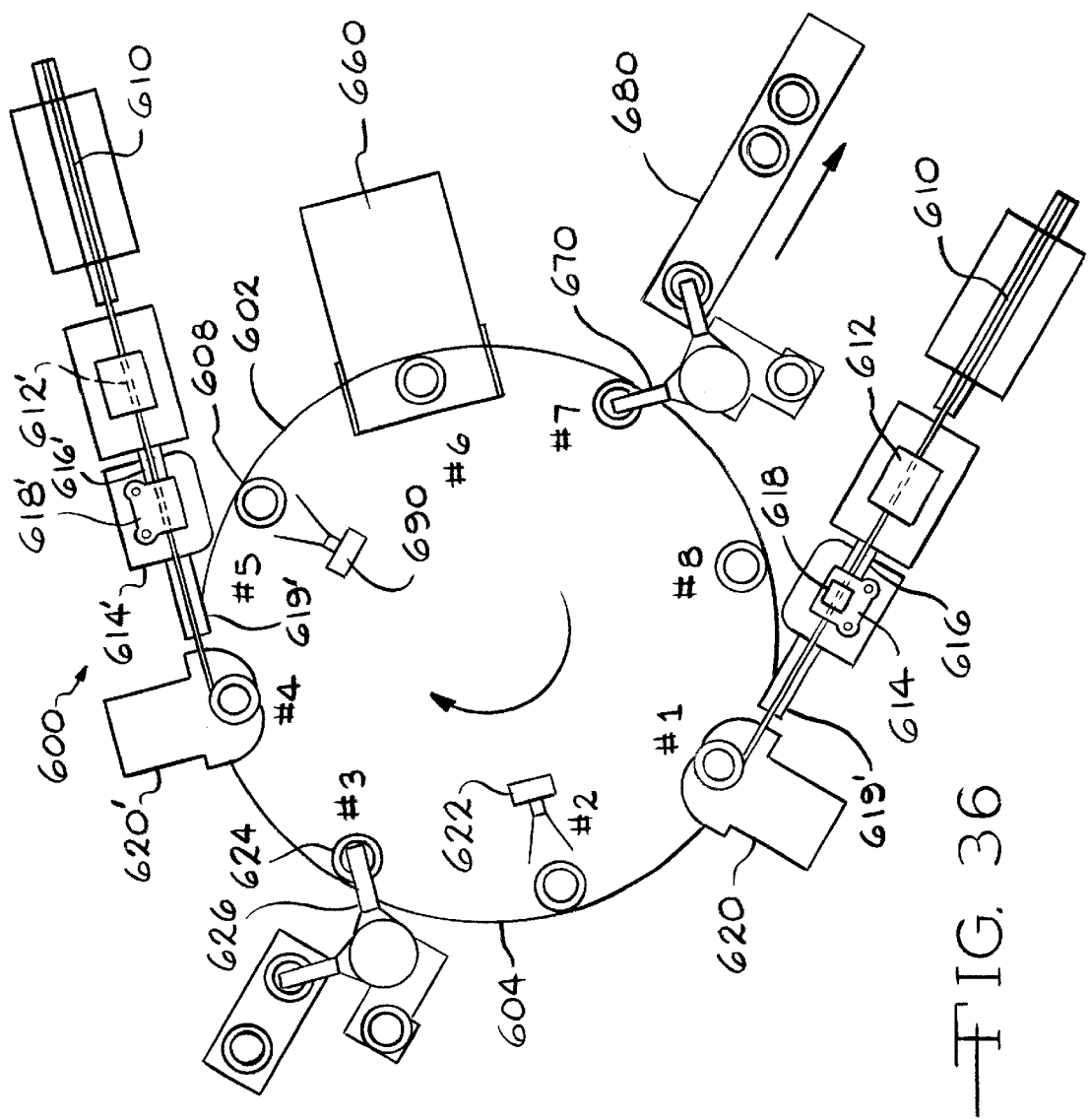
FIG. 36 is a schematic plan view of an alternative indexing apparatus for dispensing a Λ-notched friction material.

Referring now to FIG. 36, a schematic view of another type of apparatus for making a friction plate having a Λ-notch friction material thereon is generally provided. The apparatus 600 generally includes an indexing table 602 having a circular top 604 and is rotary indexed by a motor and gearbox (not shown).

A plurality of bonding nests 608 are mounted on the top 604 of the indexing table 602. In the present embodiment, there are eight bonding nests 608, however, the number of nests 608 can vary, depending on the application.

The apparatus 600 includes a plurality of work stations. At Station #1, a coil of friction material 610 is fed by a powered stock straightener 612 to a stamping press 614 which contains a stock feeder 616 and a progressive stamping die 618. The stamping die 618 stamps out the Λ-notch and inside radius geometry, as shown in FIG. 18. The stamping die 618 contains a cam actuated punch that is activated after a predetermined number of press strokes, thereby cutting off the notch section to a predetermined length. The length of Λ-notched material is transferred to a pickup location either by a servo motor driven wheel or by a linear translation device 619 to the multiple link loading device 620. The multiple link loading device 620, as described in detail above, has vacuum ports in each link which holds the Λ-notched friction material while forming the Λ-notched friction material into a circular shape. The multiple link loading device 620 and formed friction material are moved over the bonding nest 608. The second translation device (not shown) lowers the multiple link loading device 620 and formed friction material into the cavity of the bonding nest 608. The vacuum is reversed and the multiple link loading device 620 is raised, leaving the formed friction material inserted in the bonding nest 608.

The bonding nest 608 with the first inserted friction material is advanced to Station #2 where a first suitable inspection device 522, such as a camera, is used to inspect for proper placement of the circular formed friction material 619 into the bonding nest 608.

At Station #3, a glued core plate 624 is loaded by a loading apparatus 626 onto the first formed and inserted friction material in the bonding nest 608.

At Station #4, a second set of blanking and loading apparatus 620' similar to that in Station #1 produces, forms and inserts a second Λ-notched friction material on an opposing side of the glued core plate 624.

The nest 608 is further advanced to Station #5 where a second suitable inspection means 690, such as a camera, is used to inspect for proper placement of the second Λ-notched friction material on the core 624.

Thereafter, the core 624, having the first material and second 629 material of Λ-notched friction material adjacent the core 624, is advanced to Station #6 for bonding using, for example, a hydraulic C-frame press 660 with an induction heated die to polymerize the glue and bond the Λ-notched friction materials to the core 624.

Thereafter, the bonded friction plate is advanced to Station #7 where a pick and place device 670 removes the bonded plate and places it onto an exit conveyor 680.

At Station #8, the bonding nest 608 is inspected for verification of vacancy of any components.

It should be understood that the above-described apparatus is an example of one particular type of apparatus that can be utilized to with the present invention. Other types of apparatus can be used such as an inline array apparatus, and the multiple linked loading device described above.

The above descriptions of the preferred and alternative embodiments of the present invention are intended to be illustrative and are not intended to be limiting upon the scope and content of the following claims.

I claim:

1. An apparatus for making a notched friction material comprising:
   a stamping die for producing at least one first predetermined length of friction material;
   a multiple link loading device comprising a plurality of links, each link having at least one vacuum port through which a vacuum is formed when the multiple linked loading device is adjacent the first predetermined length of the friction material;
   an encircling apparatus operatively connected to the multiple link loading device for moving the links into a circular shape; and
   at least one translation device operatively connected to the multiple link loading device for moving the encircling apparatus in a direction toward a bonding nest and for placing the length of friction material adjacent the bonding nest; the bonding nest being positioned for receiving the first length of friction material, the vacuum ports in the multiple link loading device being capable of reversing the vacuum pressure such that the first length of friction material is deposited in a circular shape in the bonding nest.

2. The apparatus of claim 1, further including:
   a core plate loading device for placing an annular core plate on the first length of friction material within the bonding nest; and
   the multiple linked loading device also being capable of supplying a second predetermined length of friction material onto a top annular surface of the core plate.

3. The apparatus of claim 2, further including a chamfering device for removing a predetermined amount of an outer edge of the friction material adjacent an outer edge of the core plate.

4. The apparatus of claim 2, further including a heating device for heating at least one bonding nest to cause the first and second lengths of friction materials to adhere to the core plate.

5. The apparatus of claim 4, wherein the heating device comprises an oven for heating a plurality of bonding nests stacked together.

6. The apparatus of claim 2, further including a heating device which comprises an induction coil apparatus for applying heat to the core plate and the first and second lengths of friction material.

7. The apparatus of claim 3, further comprising a heat conduction apparatus comprising a first heated platen and an opposing heated platen and a means for placing the core plate and opposing lengths of friction materials therebetween for applying heat to cause the first and second lengths of friction material to bond to the core plate.

8. The apparatus of claim 1, wherein the friction material comprises a plurality of connected sections and a plurality of notches, each connected section being defined by adjacent notches in the friction material, and
   each notch having an apex which compensates for tear and compression of the friction material when the friction material is formed into a circular shape.

9. The apparatus of claim 8, wherein each notch has an angle generally defined by a formula comprising: 360°/number of notches in the friction material.

10. The apparatus of claim 8, each notch has a substantially Λ-shape.

11. The apparatus of claim 8, wherein the apex of each notch has a substantially circular shape.

12. The apparatus of claim 8, wherein the friction material has about 12 to about 40 notches.

13. The apparatus of claim 8, wherein at least one of the notches defines opposing, radially extending and parallel sides when the friction material is formed into a circular shape.

14. The apparatus of claim 8, wherein at least one of the notches defines a first radially extending side which extends at a first angle from an inner edge of the friction material and further defines a second, opposing radially extending side which extends at a second angle from the inner edge of the friction material.

15. The apparatus of claim 8, wherein at least one notch defines a groove, which groove is formed when the friction material is formed into the circular shape, the groove having a width W that is determined by an offset distance D from opposing sides of the notch.

16. The apparatus of claim 15, wherein the distance D is measured from a side of an angle to the side of the notch, the angle extending from an apex point P adjacent the apex to an inner edge of the friction material.

17. The apparatus of claim 8, when the apex terminates at a distance H from an outer edge of the friction material, the distance H defining a bridge section of the friction material which extends between a distal end of the apex and the outer edge of the friction material.

18. The apparatus of claim 17, wherein a portion C of the bridge section is compressed, while a portion T of the bridge section is stretched or under tension, the compressed portion C extending from an apex point P to the distal end of the apex and the tensioned portion T extending from the apex point P to the outer edge of the friction material.

19. The apparatus of claim 18, wherein the compressed portion C comprises between about 20 to about 40% of the distance H, while the tensioned portion T comprises about 60 to about 80% of the distance H.

20. The apparatus of claim 8, wherein each notch defines a closed end groove on the friction material.

21. The apparatus of claim 8, wherein a predetermined amount of an outer edge of the friction material is removed by a chamfering device whereby at least one notch defines at least a partially opened groove on the friction plate.

22. The apparatus of claim 21, wherein the friction material is positioned adjacent a core plate such that an overhang portion of the friction material extends beyond the outer edge of the core plate, and wherein the overhang portion is removed from the friction material.

23. The apparatus of claim 22, wherein the predetermined amount of the outer edge of the friction material is removed at an angle $\beta°$ of between about 25 to about 35° from a line perpendicular to a plane defined by an annular surface of the core plate.

* * * * *